US012794184B2

(12) United States Patent
Yao

(10) Patent No.: US 12,794,184 B2
(45) Date of Patent: Nov. 10, 2026

(54) ELECTRICAL CONNECTOR AND CONNECTOR ASSEMBLY THEREOF WITH IMPROVED SHIELDING EFFECT

(71) Applicant: DONGGUAN LUXSHARE TECHNOLOGIES CO., LTD, Dongguan City (CN)

(72) Inventor: Kunlin Yao, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 364 days.

(21) Appl. No.: 18/645,620

(22) Filed: Apr. 25, 2024

(65) Prior Publication Data

US 2025/0087943 A1 Mar. 13, 2025

(30) Foreign Application Priority Data

Sep. 11, 2023 (CN) ......................... 202311170976.9

(51) Int. Cl.

*H01R 13/6587* (2011.01)
*H01R 12/71* (2011.01)
*H01R 13/6581* (2011.01)
*H01R 13/6585* (2011.01)
*H01R 13/6471* (2011.01)

(52) U.S. Cl.

CPC ....... *H01R 13/6587* (2013.01); *H01R 12/716* (2013.01); *H01R 13/6581* (2013.01); *H01R 13/6585* (2013.01); *H01R 13/6471* (2013.01)

(58) Field of Classification Search

CPC ............ H01R 13/6471; H01R 13/6585; H01R 13/6588; H01R 13/6587; H01R 12/714; H01R 12/718

USPC ...................................................... 439/78, 87

See application file for complete search history.

(56) References Cited

U.S. PATENT DOCUMENTS

| | | | | |
|---|---|---|---|---|
| 9,166,320 B1 * | 10/2015 | Herring | H01R 12/79 |
| 9,711,887 B1 * | 7/2017 | Hu | H01R 13/6585 |
| 11,189,943 B2 * | 11/2021 | Zerebilov | G02B 6/4246 |
| 11,431,134 B2 * | 8/2022 | Huang | H01R 13/6594 |
| 11,563,291 B2 * | 1/2023 | Gilkey | H01R 13/6474 |
| 11,735,848 B2 * | 8/2023 | Wang | H01R 13/6658 439/78 |
| 12,537,342 B2 * | 1/2026 | Lin | H01R 12/707 |

(Continued)

FOREIGN PATENT DOCUMENTS

| | | |
|---|---|---|
| CN | 109361116 B | 8/2020 |
| CN | 112510442 A | 3/2021 |

*Primary Examiner* — Marcus E Harcum

(74) *Attorney, Agent, or Firm* — Birch, Stewart, Kolasch & Birch, LLP

(57) ABSTRACT

An electrical connector includes a first terminal module and a shielding mounting base. The first terminal module includes a first insulating block, a first signal terminal and a second signal terminal. The first signal terminal includes a first elastic contact arm. The second signal terminal includes a second elastic contact arm. The shielding mounting base includes a first rib and a second rib. The first rib and the second rib serve as a first ground terminal and a second ground terminal respectively, and are configured to be electrically connected to a first ground conductive pad and the second ground conductive pad of a circuit board, directly or indirectly. A connector assembly including the electrical connector is also disclosed.

19 Claims, 23 Drawing Sheets

(56) References Cited

U.S. PATENT DOCUMENTS

| | | | | |
|---|---|---|---|---|
| 12,555,935 | B2 * | 2/2026 | Liu | H01R 12/714 |
| 2012/0184140 | A1 * | 7/2012 | Davis | H01R 13/6587 439/607.34 |
| 2017/0033508 | A1 * | 2/2017 | Hsu | H01R 13/6585 |
| 2019/0052020 | A1 * | 2/2019 | Chen | H01R 13/504 |
| 2019/0237912 | A1 * | 8/2019 | Little | H01R 12/724 |
| 2019/0288422 | A1 * | 9/2019 | Champion | H01R 13/6587 |
| 2020/0136316 | A1 * | 4/2020 | Cho | H01R 13/6471 |
| 2021/0091496 | A1 * | 3/2021 | Cartier, Jr. | H01R 12/79 |
| 2022/0094116 | A1 * | 3/2022 | Lin | H01R 13/6597 |
| 2022/0115816 | A1 * | 4/2022 | Huang | H01R 12/714 |
| 2022/0115820 | A1 * | 4/2022 | Lin | H01R 13/6594 |
| 2022/0384995 | A1 * | 12/2022 | Zeng | H01R 13/6477 |
| 2024/0088587 | A1 * | 3/2024 | Harmon, III | H01R 13/6585 |
| 2024/0388023 | A1 * | 11/2024 | Hammoodi | H01R 12/79 |

* cited by examiner

ELECTRICAL CONNECTOR AND CONNECTOR ASSEMBLY THEREOF WITH IMPROVED SHIELDING EFFECT

CROSS-REFERENCE TO RELATED APPLICATION

This patent application claims priority of a Chinese Patent Application No. 202311170976.9, filed on Sep. 11, 2023 and titled "ELECTRICAL CONNECTOR AND CONNECTOR ASSEMBLY", the entire content of which is incorporated herein by reference.

TECHNICAL FIELD

The present disclosure relates to an electrical connector and a connector assembly, which belongs to the technical field of connectors.

BACKGROUND

Electrical connectors in the related art generally include a plurality of conductive terminals. The plurality of conductive terminals include a plurality of signal terminal groups, a first ground terminal located on one side of each signal terminal group, and a second ground terminal located on another side of each signal terminal group. Each signal terminal group generally includes a first signal terminal and a second signal terminal. In general, each of the first signal terminal, the second signal terminal, the first ground terminal and the second ground terminal is provided with an elastic contact arm to achieve electrical connection with corresponding a conductive pad of a circuit board.

In order to solve the problem of signal crosstalk, the distance between the first signal terminal and the second signal terminal in each signal terminal group needs to be set larger. When the number of conductive terminals increases, a larger space is required, which is not beneficial to miniaturization of the electrical connector.

Besides, in order to improve the shielding effect of each signal terminal group, widths of the first ground terminal and the second ground terminal are being designed to be wider and wider. On the one hand, this design increases the force between the elastic contact arms of the conductive terminals and the circuit board, which can easily lead to poor contact; on the other hand, this design is not beneficial to the miniaturization of the electrical connector.

SUMMARY

An object of the present disclosure is to provide an electrical connector and a connector assembly with improved shielding effect and easy miniaturization.

In order to achieve the above object, the present disclosure adopts the following technical solution: an electrical connector, including: a first terminal module including a first insulating block and a plurality of first conductive terminals fixed to the first insulating block; the plurality of first conductive terminals including at least one first terminal group; each first terminal group including a first signal terminal and a second signal terminal; the first signal terminal and the second signal terminal being disposed adjacent to each other and disposed side by side along a first direction; the first signal terminal including a first elastic contact arm; the second signal terminal including a second elastic contact arm; and a shielding mounting base, the first terminal module being at least partially mounted to the shielding mounting base; the shielding mounting base including a mounting surface, a first rib exposed to the mounting surface, a second rib exposed to the mounting surface, and a first accommodation space located between the first rib and the second rib; the first elastic contact arm of the first signal terminal and the second elastic contact arm of the second signal terminal of the first terminal group at least partially extending into the first accommodation space along a second direction; wherein the first rib, the first elastic contact arm of the first signal terminal, the second elastic contact arm of the second signal terminal, and the second rib are sequentially disposed along the first direction; the first elastic contact arm of the first signal terminal and the second elastic contact arm of the second signal terminal are configured to be respectively electrically connected to a first signal conductive pad and a second signal conductive pad of a circuit board, directly or indirectly; the first rib and the second rib serve as a first ground terminal and a second ground terminal respectively, and are configured to be respectively electrically connected to a first ground conductive pad and a second ground conductive pad of the circuit board, directly or indirectly.

In order to achieve the above object, the present disclosure adopts the following technical solution: a connector assembly, including: a circuit board including a first signal conductive pad, a second signal conductive pad, a first ground conductive pad and a second ground conductive pad; and an electrical connector mounted to the circuit board, the electrical connector including: a first terminal module including a first insulating block and a plurality of first conductive terminals fixed to the first insulating block; the plurality of first conductive terminals including at least one first terminal group; each first terminal group including a first signal terminal and a second signal terminal; the first signal terminal and the second signal terminal being disposed adjacent to each other and disposed side by side along a first direction; the first signal terminal including a first elastic contact arm; the second signal terminal including a second elastic contact arm; and a shielding mounting base, the first terminal module being at least partially mounted to the shielding mounting base; the shielding mounting base including a first rib, a second rib, and a first accommodation space located between the first rib and the second rib; the first elastic contact arm of the first signal terminal and the second elastic contact arm of the second signal terminal of the first terminal group at least partially extending into the first accommodation space along a second direction; wherein the first rib, the first elastic contact arm of the first signal terminal, the second elastic contact arm of the second signal terminal, and the second rib are sequentially disposed along the first direction; the first elastic contact arm of the first signal terminal and the second elastic contact arm of the second signal terminal are configured to be respectively electrically connected to the first signal conductive pad and the second signal conductive pad, directly or indirectly; the first rib and the second rib serve as a first ground terminal and a second ground terminal respectively, and are configured to be respectively electrically connected to the first ground conductive pad and the second ground conductive pad, directly or indirectly.

Compared with the prior art, the shielding mounting base of the present disclosure includes the first rib and the second rib. The first rib, the first elastic contact arm of the first signal terminal, the second elastic contact arm of the second signal terminal, and the second rib are sequentially disposed along the first direction. The first rib and the second rib are capable of providing shielding for the first signal terminal and the second signal terminal located therebetween, thereby improving the quality of signal transmission. Besides, the first rib and the second rib respectively serve as the first ground terminal and the second ground terminal, and are configured to be respectively electrically connected to the first ground conductive pad and the second ground conductive pad of the circuit board, directly or indirectly, which greatly improves many problems caused by the use of elastic contact arm type ground terminals in related technologies.

DETAILED DESCRIPTION

Figure 1:
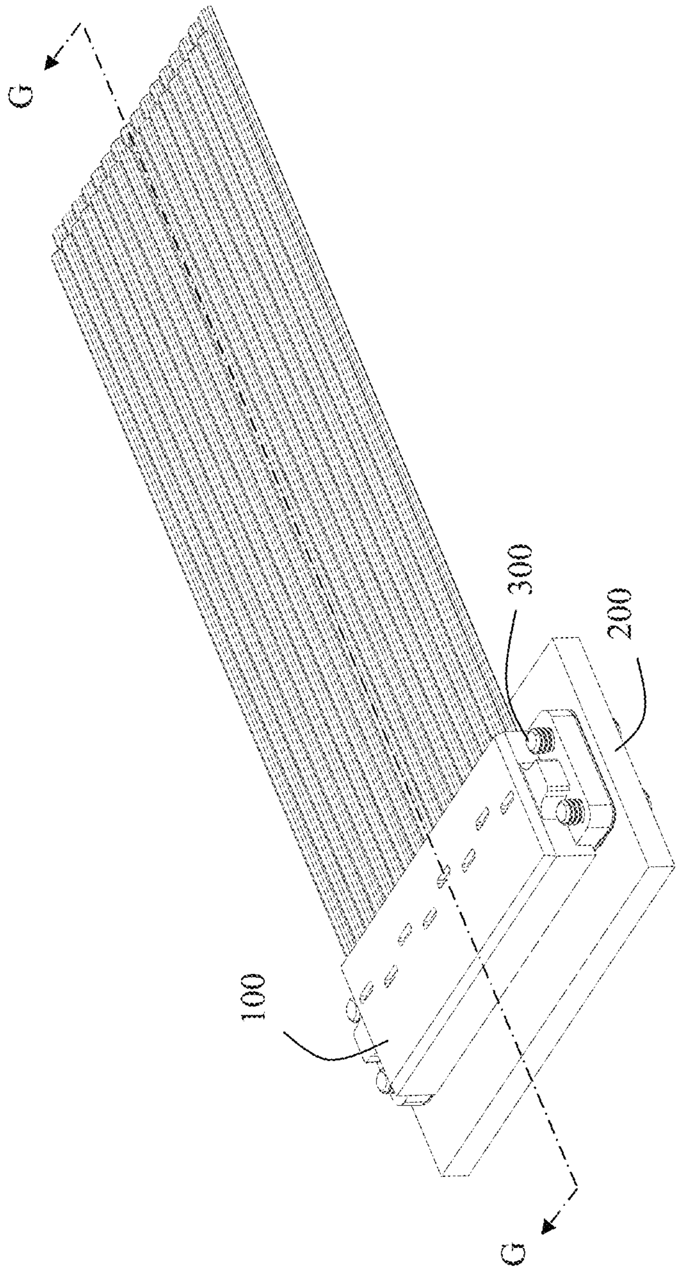
FIG. 1 is a perspective schematic view of a connector assembly in accordance with an illustrated embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 4, the present disclosure discloses a connector assembly which includes a circuit board 200, an electrical connector 100 mounted to the circuit board 200, and a plurality of fasteners 300 configured to fasten the electrical connector 100 and the circuit board 200.

Figure 2:
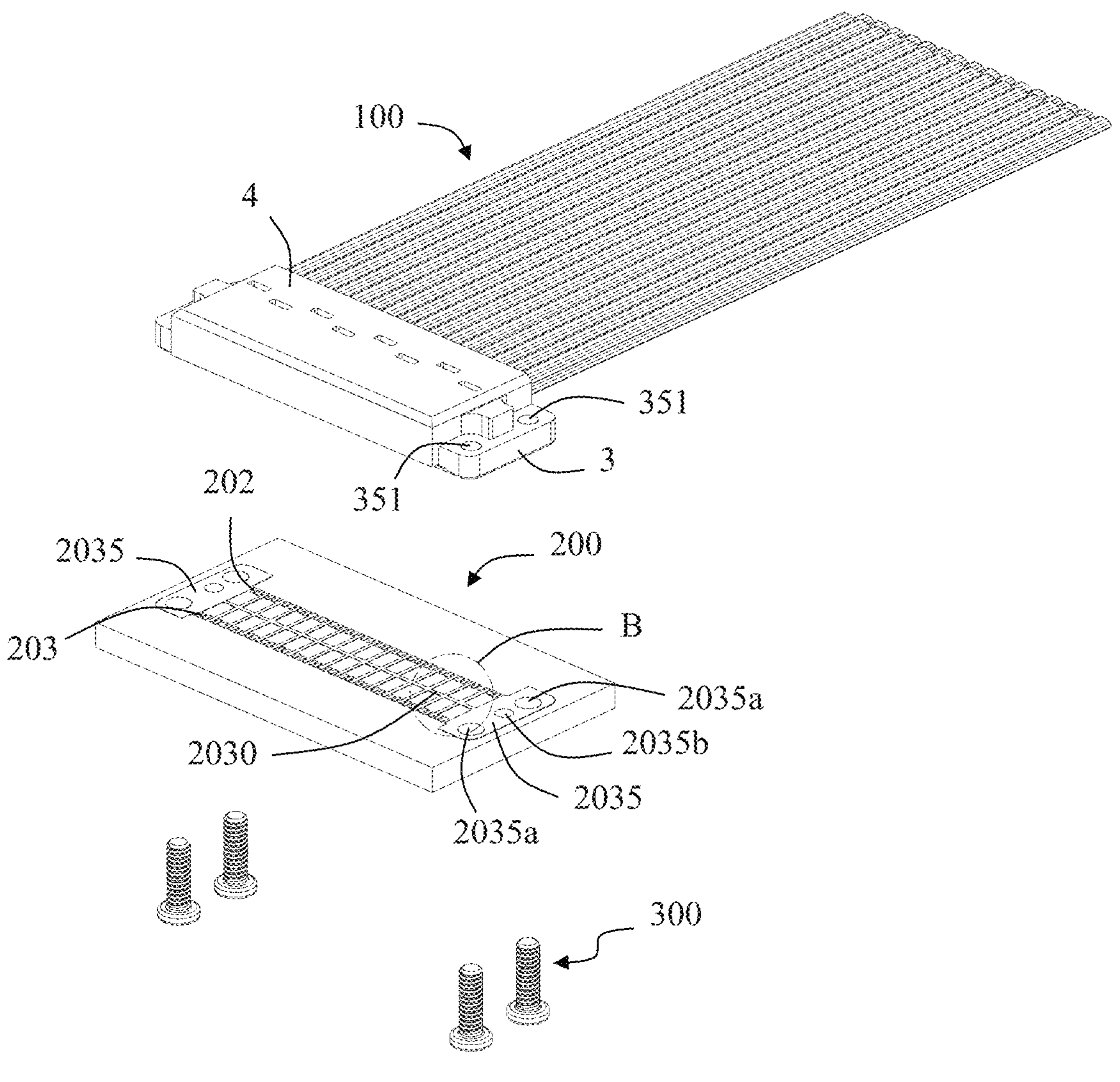
FIG. 2 is a partially exploded perspective view of FIG. 1.
Figure 3:
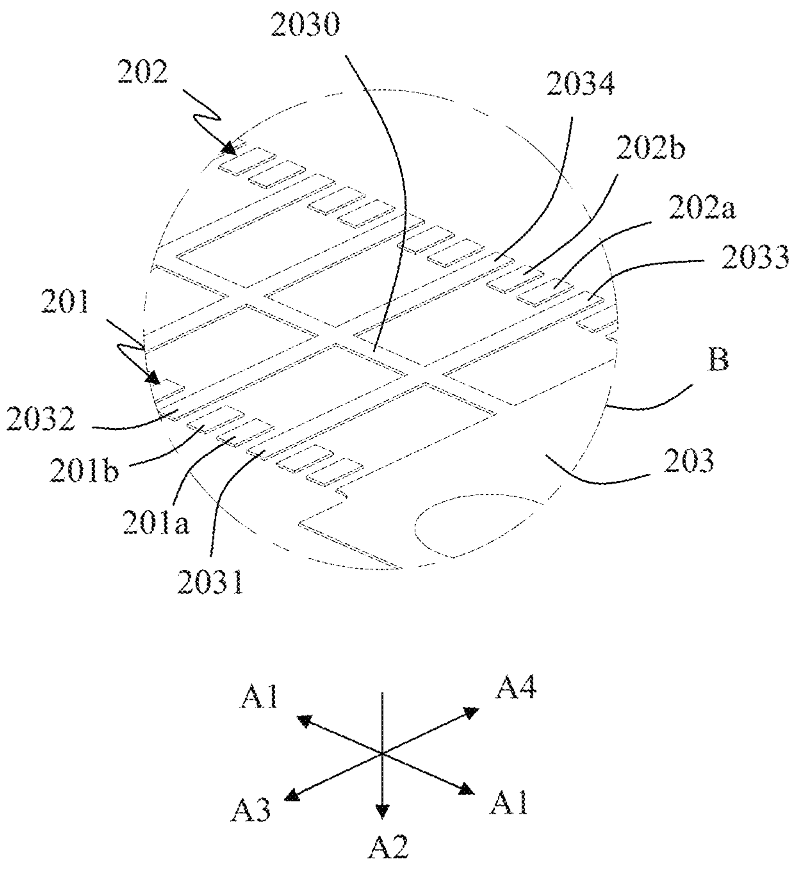
FIG. 3 is a partial enlarged view of a circled part B in FIG. 2.
Figure 4:
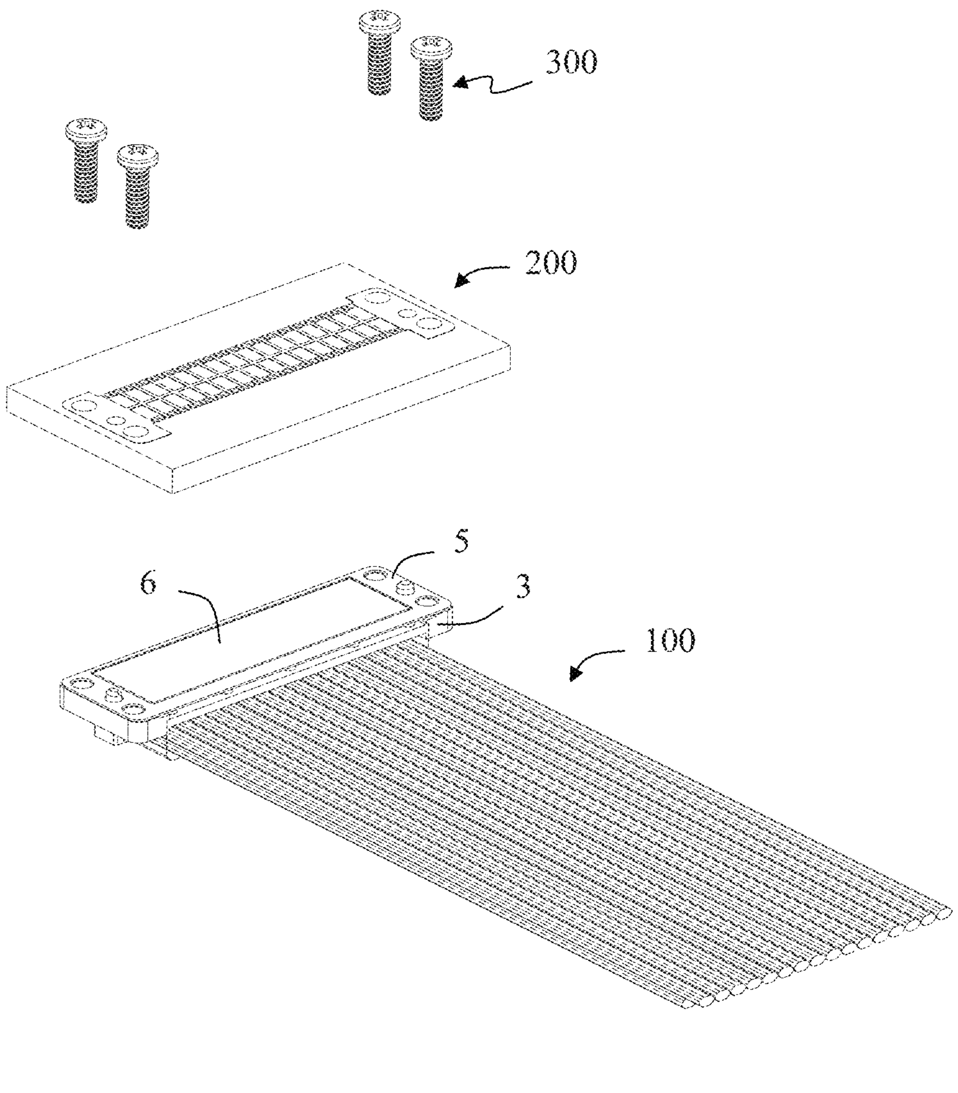
FIG. 4 is a partially exploded perspective view of FIG. 2 from another angle.
Figure 5:
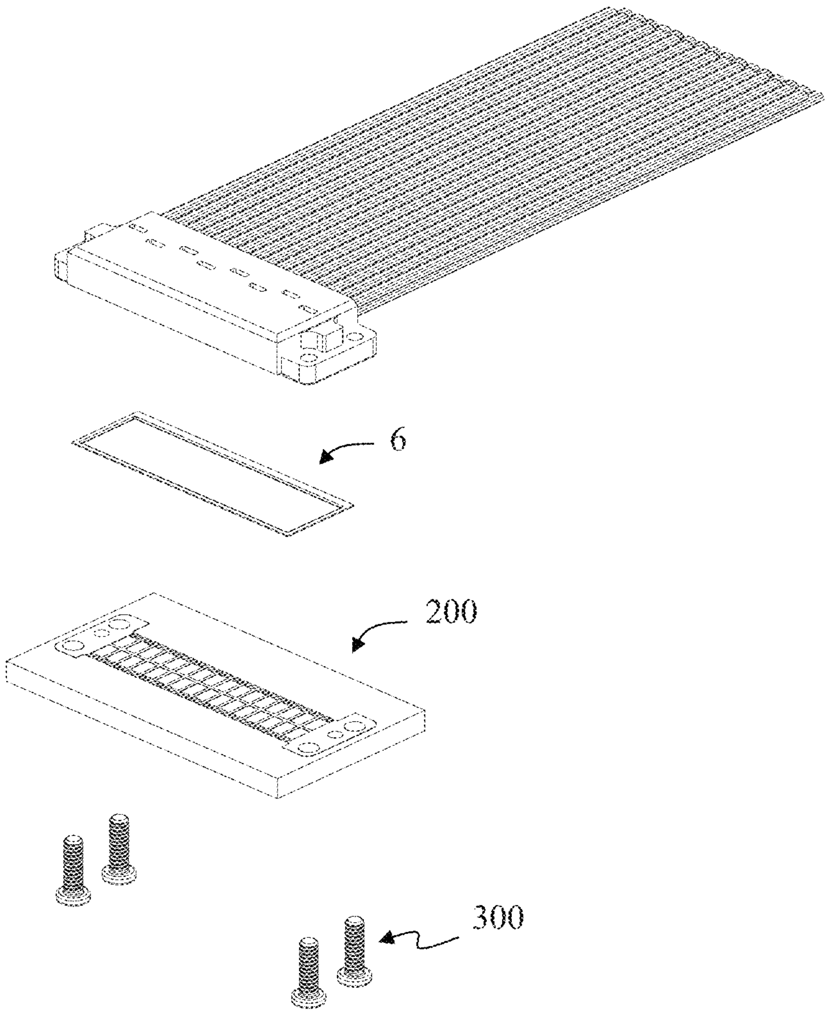
FIG. 5 is a further exploded perspective view of FIG. 2.
Figure 6:
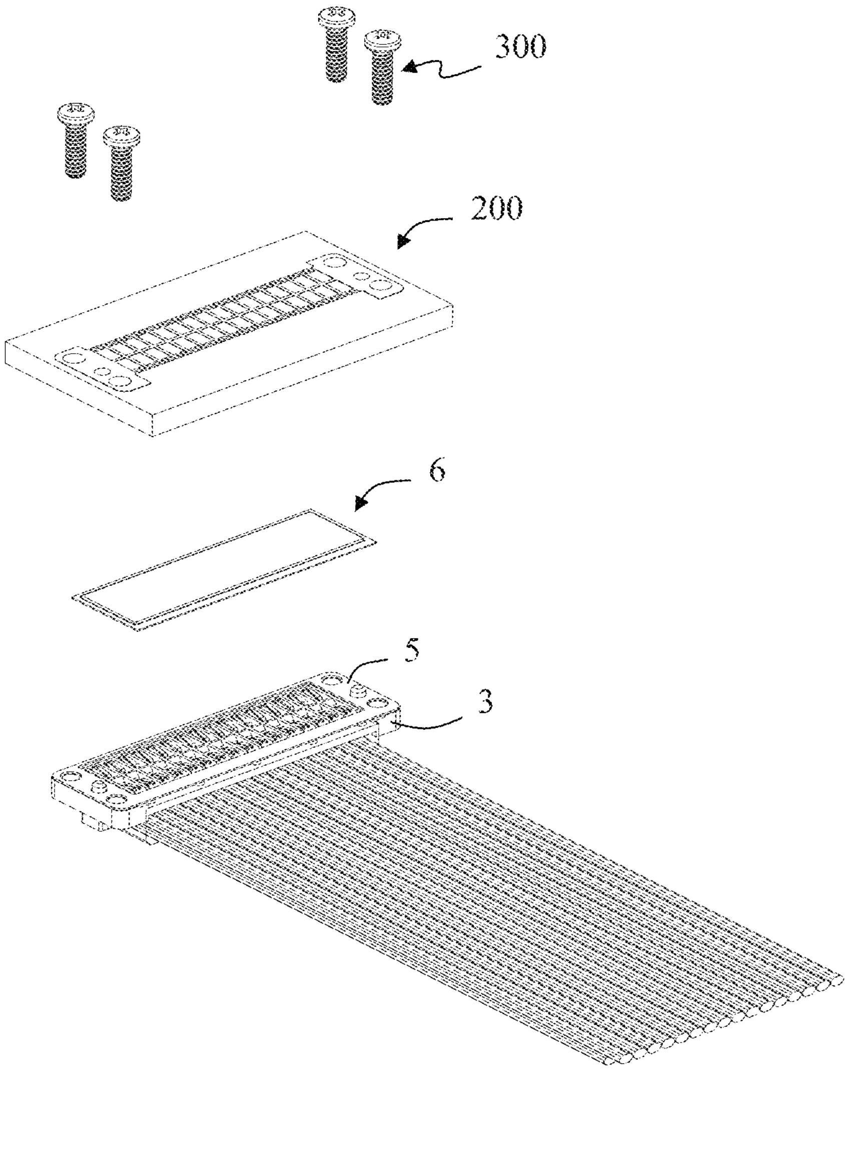
FIG. 6 is an exploded perspective view of FIG. 5 from another angle.

Referring to FIG. 2 and FIG. 3, in the illustrated embodiment of the present disclosure, the circuit board 200 includes a plurality of first conductive pads 201, a plurality of second conductive pads 202 and a grounding bar 203. The plurality of first conductive pads 201 are disposed in a row along a first direction A1-A1 (for example, a left-right direction). The plurality of second conductive pads 202 are disposed in another row along the first direction A1-A1. The row in which the plurality of first conductive pads 201 are located and the another row in which the plurality of second conductive pads 202 are located are parallel to each other.

The plurality of first conductive pads 201 are distributed in multiple groups, wherein each group includes a first signal conductive pad 201*a* and a second signal conductive pad 201*b*. Similarly, the plurality of second conductive pads 202 are distributed in multiple groups, wherein each group includes a third signal conductive pad 202*a* and a fourth signal conductive pad 202*b*. In the illustrated embodiment of the present disclosure, the plurality of first conductive pads 201 and the plurality of second conductive pads 202 are aligned in a one-to-one correspondence manner along a third direction A3 (for example, a rear-to-front direction).

The grounding bar 203 includes a ground connection portion 2030, a plurality of first ground conductive pads 2031 extending from a first side of the ground connection portion 2030 along the third direction A3, a plurality of second ground conductive pads 2032 extending from the first side of the ground connection portion 2030 along the third direction A3, a plurality of third ground conductive pads 2033 extending from a second side of the ground connection portion 2030 along a fourth direction A4 (for example, a front-to-rear direction), and a plurality of fourth ground conductive pads 2034 extending from the second side of the ground connection portion 2030 along the fourth direction A4. The first ground conductive pads 2031 and the second ground conductive pads 2032 are alternately arranged along the first direction A1-A1. The third ground conductive pads 2033 and the fourth ground conductive pads 2034 are alternately arranged along the first direction A1-A1. In the illustrated embodiment of the present disclosure, the plurality of first ground conductive pads 2031 and the plurality of third ground conductive pads 2033 are aligned in a one-to-one correspondence manner along the third direction A3. The plurality of second ground conductive pads 2032 and the plurality of fourth ground conductive pads 2034 are aligned in a one-to-one correspondence manner along the third direction A3. The ground connection portion 2030 connects the plurality of first ground conductive pads 2031, the plurality of second ground conductive pads 2032, the plurality of third ground conductive pads 2033 and the plurality of fourth ground conductive pads 2034 in series into a whole, so as to improve the shielding effect and reduce signal crosstalk.

In the illustrated embodiment of the present disclosure, a length of the first ground conductive pad 2031 along the third direction A3 is greater than a length of the first signal conductive pad 201*a* along the third direction A3, and is also greater than a length of the second signal conductive pad 201*b* along the third direction A3. A length of the second ground conductive pad 2032 along the third direction A3 is greater than the length of the first signal conductive pad 201*a* along the third direction A3, and is also greater than the length of the second signal conductive pad 201*b* along the third direction A3. A length of the third ground conductive pad 2033 along the fourth direction A4 is greater than a length of the third signal conductive pad 202*a* along the fourth direction A4, and is also greater than a length of the fourth signal conductive pad 202*b* along the fourth direction A4. A length of the fourth ground conductive pad 2034 along the fourth direction A4 is greater than the length of the third signal conductive pad 202*a* along the fourth direction A4, and is also greater than the length of the fourth signal conductive pad 202*b* along the fourth direction A4. This arrangement is beneficial to improve the quality of signal transmission.

In the illustrated embodiment of the present disclosure, the grounding bar 203 further includes two mounting areas 2035 located on two sides of the circuit board 200. In each mounting area, the circuit board 200 includes a plurality of first mounting holes 2035*a* and a positioning hole 2035*b* that extends through the circuit board 200 along a thickness direction of the circuit board 200.

In the illustrated embodiment of the present disclosure, the fasteners 300 are a plurality of bolts.

The electrical connector 100 includes a shielding mounting base 3, a first terminal module 1 mounted to the shielding mounting base 3, a second terminal module 2 mounted to the shielding mounting base 3, and an outer housing 4 at least partially formed on the first terminal module 1 and the second terminal module 2.

Referring to FIGS. 4 to 14, the shielding mounting base 3 includes a mounting surface 30 (such as a lower surface), a first installation groove 31 extending through the shielding mounting base 3 along a thickness direction of the shielding mounting base 3, a second installation groove 32 extending through the shielding mounting base 3 along the thickness direction of the shielding mounting base 3, a plurality of first positioning blocks 33 protruding into the first installation groove 31 along the third direction A3, and a plurality of second positioning blocks 34 protruding into the second installation groove 32 along the fourth direction A4. Besides, the shielding mounting base 3 further includes two mounting protrusions 35 located on two sides of the shielding mounting base 3, respectively. Each mounting protrusion 35 includes a plurality of second mounting holes 351 extending through the mounting protrusion 35 along the thickness direction of the shielding mounting base 3, and a positioning post 352 protruding downwardly beyond the mounting surface 30. The plurality of second mounting holes 351 and the plurality of first mounting holes 2035*a* are aligned with each other to allow the plurality of bolts to pass through. The positioning post 352 is configured to be inserted into a corresponding positioning hole 2035*b*.

Besides, the shielding mounting base 3 further includes a plurality of first ribs 361 exposed to the mounting surface 30, a plurality of second ribs 362 exposed to the mounting surface 30, a plurality of third ribs 363 exposed to the mounting surface 30, a plurality of fourth ribs 364 exposed to the mounting surface 30, and a connecting bar 365 exposed to the mounting surface 30. The connecting bar 365 extends along the first direction A1-A1. The plurality of first ribs 361 and the plurality of second ribs 362 extend integrally from the connecting bar 365 along the third direction A3. The plurality of first ribs 361 and the plurality of second ribs 362 are alternately disposed along the first direction A1-A1. The plurality of third ribs 363 and the plurality of fourth ribs 364 extend integrally from the connecting bar 365 along the fourth direction A4. The plurality of third ribs 363 and the plurality of fourth ribs 364 are alternately disposed along the first direction A1-A1. The plurality of first ribs 361 and the plurality of second ribs 362 are located on one side of the connecting bar 365; and the plurality of third ribs 363 and the plurality of fourth ribs 364 are located on the other side of the connecting bar 365. In the illustrated embodiment of the present disclosure, the plurality of first ribs 361, the plurality of second ribs 362, the plurality of third ribs 363 and the plurality of fourth ribs 364 are integrally formed with the shielding mounting base 3. Contact surfaces (for example, lower surfaces) of the plurality of first ribs 361, contact surfaces (for example, lower surfaces) of the plurality of second ribs 362, contact surfaces (for example, lower surfaces) of the plurality of third ribs 363 and contact surfaces (for example, lower surfaces) of the plurality of fourth ribs 364 are located in a same plane (i.e., coplanar).

The shielding mounting base 3 further includes a first accommodation space 371 located between adjacent first rib 361 and second rib 362; and the first accommodation space 371 is substantially U-shaped. Similarly, the shielding mounting base 3 includes a second accommodation space 372 located between adjacent third rib 363 and fourth rib 364; and the second accommodation space 372 is substantially U-shaped.

Each first rib 361 includes a first contact surface 3611 that is configured to be electrically connected to the first ground conductive pad 2031, directly or indirectly. The second rib 362 includes a second contact surface 3621 that is configured to be electrically connected to the second ground conductive pad 2032, directly or indirectly. The third rib 363 includes a third contact surface 3631 that is configured to be electrically connected to the third ground conductive pad 2033, directly or indirectly. The fourth rib 364 includes a fourth contact surface 3641 that is configured to be electrically connected to the fourth ground conductive pad 2034, directly or indirectly. The connecting beam 365 includes a fifth contact surface 3651 that is configured to be electrically connected to the ground connection portion 2030, directly or indirectly. In the illustrated embodiment of the present disclosure, the first contact surface 3611, the second contact surface 3621, the third contact surface 3631, the fourth contact surface 3641 and the fifth contact surface 3651 are coplanar and all are located in a first plane.

In the illustrated embodiment of the present disclosure, the shielding mounting base 3 is made of metal and/or conductive plastic so as to improve the shielding effect on the signal terminals and reduce crosstalk.

The first terminal module 1 includes a first insulating block 11, a plurality of first conductive terminals 12 fixed to the first insulating block 11, a first grounding sheet 13 mounted to the first insulating block 11, and a plurality of first cables 14.

The first insulating block 11 is at least partially received in the first installation groove 31. The first insulating block 11 defines a plurality of first positioning slots 111 that are engaged with the first positioning blocks 33.

In the illustrated embodiment of the present disclosure, the plurality of first conductive terminals 12 are insert-molded with the first insulating block 11. The plurality of first conductive terminals 12 include at least one first terminal group T1. Each first terminal group T1 includes a first signal terminal S1 and a second signal terminal S2. The first signal terminal S1 and the second signal terminal S2 are disposed adjacent to each other and arranged side by side along the first direction A1-A1.

The first signal terminal S1 includes a first fixing portion 121*a* fixed in the first insulating block 11, a first elastic contact arm 122*a* extending from one end of the first fixing portion 121*a*, and a first soldering portion 123*a* extending from the other end of the first fixing portion 121*a*. The first soldering portion 123*a* is exposed on a top surface of the first insulating block 11.

Similarly, the second signal terminal S2 includes a second fixing portion 121*b* fixed in the first insulating block 11, a second elastic contact arm 122*b* extending from one end of the second fixing portion 121*b*, and a second soldering portion 123*b* extending from the other end of the second fixing portion 121*b*. The second soldering portion 123*b* is exposed on the top surface of the first insulating block 11.

The first grounding sheet 13 is stamped from a metal sheet. The first grounding sheet 13 includes a first base 130, a plurality of first mounting tabs 131 integrally extending from one side of the first base 130 along the fourth direction A4, and a plurality of second mounting tabs 132 integrally extending from the one side of the first base 130 along the fourth direction A4. The plurality of first mounting tabs 131 and the plurality of second mounting tabs 132 are alternately disposed along the first direction A1-A1. Preferably, the first grounding sheet 13 is in contact with the shielding mounting base 3 so as to increase a common grounding area. In the illustrated embodiment of the disclosure, the first mounting tab 131, the first soldering portion 123*a*, the second soldering portion 123*b* and the second mounting tab 132 are disposed sequentially along the first direction A-A1.

The plurality of first cables 14 include a first signal cable 141, a second signal cable 142, a first ground cable 143 and a second ground cable 144. The first ground cable 143 is connected to the first mounting tab 131. The first signal cable 141 is connected to the first soldering portion 123*a*. The second signal cable 142 is connected to the second soldering portion 123*b*. The second ground cable 144 is connected to the second mounting tab 132. Preferably, the first ground cable 143 and the first mounting tab 131 are fixed by soldering or welding. The first signal cable 141 and the first soldering portion 123*a* are fixed by soldering or welding. The second signal cable 142 and the second soldering portion 123*b* are fixed by soldering or welding. The second ground cable 144 and the second mounting tab 132 are fixed by soldering or welding.

The second terminal module 2 includes a second insulating block 21, a plurality of second conductive terminals 22 fixed to the second insulating block 21, a second grounding sheet 23 fixed to the second insulating block 21, and a plurality of second cables 24.

The second insulating block 21 is at least partially received in the second installation slot 32. The second insulating block 21 defines a plurality of second positioning slots 211 that are engaged with the second positioning blocks 34.

In the illustrated embodiment of the present disclosure, the plurality of second conductive terminals 22 are insert-molded with the second insulating block 21. The plurality of second conductive terminals 22 include at least one second terminal group T2. Each second terminal group T2 includes a third signal terminal S3 and a fourth signal terminal S4. The third signal terminal S3 and the fourth signal terminal S4 are located adjacent to each other and arranged side by side along the first direction A1-A1.

The third signal terminal S3 includes a third fixing portion 221*a* fixed to the second insulating block 21, a third elastic contact arm 222*a* extending from one end of the third fixing portion 221*a*, and a third soldering portion 223*a* extending from the other end of the third fixing portion 221*a*. The third soldering portion 223*a* is exposed on a top surface of the second insulating block 21.

Similarly, the fourth signal terminal S4 includes a fourth fixing portion 221*b* fixed to the second insulating block 21, a fourth elastic contact arm 222*b* extending from one end of the fourth fixing portion 221*b*, and a fourth soldering portion 223*b* extending from the other end of the fourth fixing portion 221*b*. The fourth soldering portion 223*b* is exposed on the top surface of the second insulating block 21.

The second grounding sheet 23 is stamped from a metal sheet. The second grounding sheet 23 includes a second base 230, a plurality of third mounting tabs 231 integrally extending from one side of the second base 230 along the fourth direction A4, and a plurality of fourth mounting tabs 232 integrally extending from the one side of the second base 230 along the fourth direction A4. The plurality of third mounting tabs 231 and the plurality of fourth mounting tabs 232 are alternately disposed along the first direction A1-A1. Preferably, the second grounding sheet 23 is in contact with the shielding mounting base 3 and/or the first grounding sheet 13 so as to increase the common grounding area. In the illustrated embodiment of the present disclosure, the third mounting tab 231, the third soldering portion 223*a*, the fourth soldering portion 223*b* and the fourth mounting tab 232 are sequentially arranged along the first direction A-A1. Besides, the second grounding sheet 23 further includes a plurality of bent portions 233 bent upwardly from one side of the second base 230. Along the first direction A1-A1, each bent portion 233 is located between a corresponding third mounting tab 231 and a corresponding fourth mounting tab 232.

The plurality of second cables 24 include a third signal cable 241, a fourth signal cable 242, a third ground cable 243 and a fourth ground cable 244. The third ground cable 243 is connected to the third mounting tab 231. The third signal cable 241 is connected to the third soldering portion 223*a*. The fourth signal cable 242 is connected to the fourth soldering portion 223*b*. The fourth ground cable 244 is connected to the fourth mounting tab 232. Preferably, the third ground cable 243 and the third mounting tab 231 are fixed by soldering or welding. The third signal cable 241 and the third soldering portion 223*a* are fixed by soldering or welding. The fourth signal cable 242 and the fourth soldering portion 223*b* are fixed by soldering or welding. The fourth ground cable 244 and the fourth mounting tab 232 are fixed by soldering or welding.

When the first terminal module 1 and the second terminal module 2 are mounted to the shielding mounting base 3, the first elastic contact arm 122*a* of the first signal terminal S1 and the second elastic contact arm 122*b* of the second signal terminal S2 of the first terminal group T1 at least partially extend into the first accommodation space 371 along a second direction A2 (for example, from a top-to-bottom direction). The third elastic contact arm 222*a* of the third signal terminal S3 and the fourth elastic contact arm 222*b* of the fourth signal terminal S4 of the second terminal group T2 at least partially extend into the second accommodation space 372 along the second direction A2. Each two of the first direction A1-A1, the second direction A2 and the third direction A3 are perpendicular to each other. The fourth direction A4 is opposite to the third direction A3.

The first rib 361, the first elastic contact arm 122*a* of the first signal terminal S1, the second elastic contact arm 122*b* of the second signal terminal S2 and the second rib 362 are sequentially disposed in a first row along the first direction A1-A1. The first elastic contact arm 122*a* of the first signal terminal S1 and the second elastic contact arm 122*b* of the second signal terminal S2 are configured to respectively electrically connected to the first signal conductive sheet 201*a* and the second signal conductive sheet 201*b* of the circuit board 200, directly or indirectly. The first rib 361 and the second rib 362 serve as a first ground terminal and a second ground terminal respectively, and are configured to be respectively electrically connected to the first ground conductive pad 2031 and the second ground conductive pad 2032 of the circuit board 200, directly or indirectly.

Similarly, the third rib 363, the third elastic contact arm 222*a* of the third signal terminal S3, the fourth elastic contact arm 222*b* of the fourth signal terminal S4 and the fourth rib 364 are sequentially arranged in a second row along the first direction A1-A1. The first row and the second row are parallel to each other. The third elastic contact arm 222*a* of the third signal terminal S3 and the fourth elastic contact arm 222*b* of the fourth signal terminal S4 are configured to be respectively electrically connected to the third signal conductive pad 202*a* and the fourth signal conductive pad 202*b* of the circuit board 200, directly or indirectly. The third rib 363 and the fourth rib 364 serve as a third ground terminal and a fourth ground terminal respectively, and are configured to be respectively electrically connected to the third ground conductive pad 2033 and the fourth ground conductive pad 2034 of the circuit board 200, directly or indirectly.

In the illustrated embodiment of the present disclosure, the first elastic contact arm 122*a* of the first signal terminal S1 and the second elastic contact arm 122*b* of the second signal terminal S2 extend along the third direction A3. The third elastic contact arm 222*a* of the third signal terminal S3 and the fourth elastic contact arm 222*b* of the fourth signal terminal S4 extend along the fourth direction A4. The first elastic contact arm 122*a* of the first signal terminal S1 and the third elastic contact arm 222*a* of the third signal terminal S3 are aligned and disposed along the third direction A3. The second elastic contact arm 122*b* of the second signal terminal S2 and the fourth elastic contact arm 222*b* of the fourth signal terminal S4 are aligned and disposed along the third direction A3.

In the illustrated embodiment of the present disclosure, the first elastic contact arm 122*a* includes a first contact portion 122*a*1 that is electrically connected to the first signal conductive pad 201*a*, directly or indirectly. The second elastic contact arm 122*b* includes a second contact portion 122*b*1 that is electrically connected to the second signal conductive pad 201*b*, directly or indirectly. The third elastic contact arm 222*a* includes a third contact portion 222*a*1 that is electrically connected to the third signal conductive pad 202*a*, directly or indirectly. The fourth elastic contact arm 222*b* includes a fourth contact portion 222*b*1 that is electrically connected to the fourth signal conductive pad 202*b*, directly or indirectly.

Compared with the existing design, the first rib 361 and the second rib 362 of the present disclosure can function as the first ground terminal and the second ground terminal, respectively; and the third rib 363 and the fourth rib 364 of the present disclosure can function as the third ground terminal and the fourth ground terminal, respectively. With this arrangement, the ground terminals do not need to be designed in a structure similar to the signal terminal, thereby reducing the number of elastic contact arms. This reduces the contact force with the circuit board 200 and improves the installation reliability of the electrical connector 100.

In the illustrated embodiment of the present disclosure, the first elastic contact arm 122*a* of the first signal terminal S1 and the second elastic contact arm 122*b* of the second signal terminal S2 are configured to be respectively electrically connected to the first signal conductive pad 201*a* and the second signal conductive pad 201*b* of the circuit board 200, directly or indirectly, through elastic contact. The first rib 361 and the second rib 362 are configured to be respectively electrically connected to the first ground conductive pad 2031 and the second ground conductive pad 2032 of the circuit board 200, directly or indirectly, by rigid contact.

Similarly, the third elastic contact arm 222*a* of the third signal terminal S3 and the fourth elastic contact arm 222*b* of the fourth signal terminal S4 are configured to be respectively electrically connected to the third signal conductive pad 202*a* and the fourth signal conductive pad 202*b* of the circuit board 200, directly or indirectly, through elastic contact. The third rib 363 and the fourth rib 364 are configured to be respectively electrically connected to the third ground conductive pad 2033 and the fourth ground conductive pad 2034 of the circuit board 200, directly or indirectly, through rigid contact.

In the illustrated embodiment of the present disclosure, the electrical connector 100 further includes a mounting plate 5 mounted to the shielding mounting base 3 and a conductive film 6 clamped between the shielding mounting base 3 and the mounting plate 5. The mounting plate 5 defines a hollow groove 50. The conductive film 6 is at least partially exposed in the hollow groove 50. It is understandable to those skilled in the art that the conductive film 6 in the illustrated embodiment of the present disclosure is in a state (i.e., a conductive state) after being pressed against by the first rib 361, the second rib 362, the third rib 363, the fourth rib 364, the first contact portion 122*a*1 of the first elastic contact arm 122*a*, the second contact portion 122*b*1 of the second elastic contact arm 122*b*, the third contact portion **222*a*1 of the third elastic contact arm 222*a*, and the fourth contact portion 222*b*1 of the fourth elastic contact arm 222*b***.

During assembly, first, the conductive film 6 is assembled to the mounting plate 5 to form an assembly. Secondly, the assembly is assembled to a corresponding position of the circuit board 200. Then, the assembled components of the electrical connector 100 are assembled to the assembly. Finally, the fasteners 300 are assembled. In an embodiment of the present disclosure, the conductive film 6 is installed on the mounting plate 5 by pasting.

Figure 7:
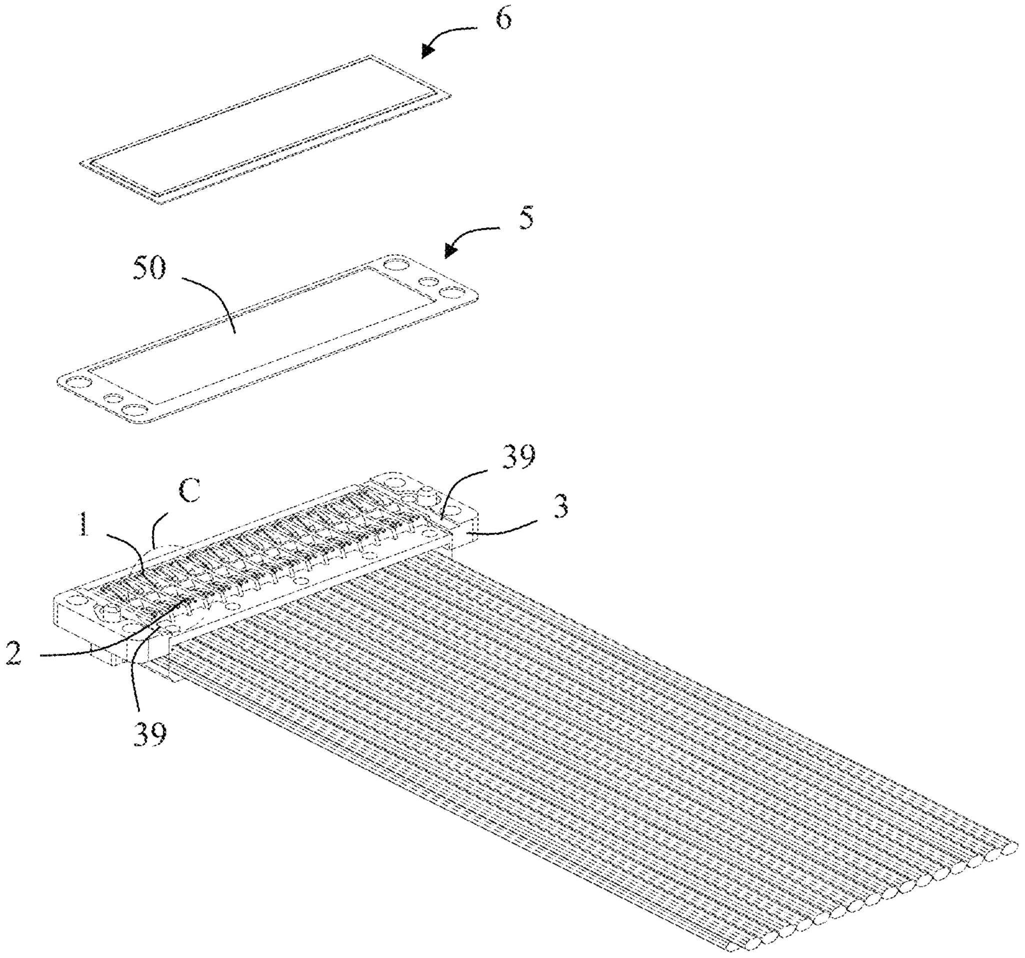
FIG. 7 is a further perspective exploded view of the electrical connector in FIG. 6.
Figure 8:
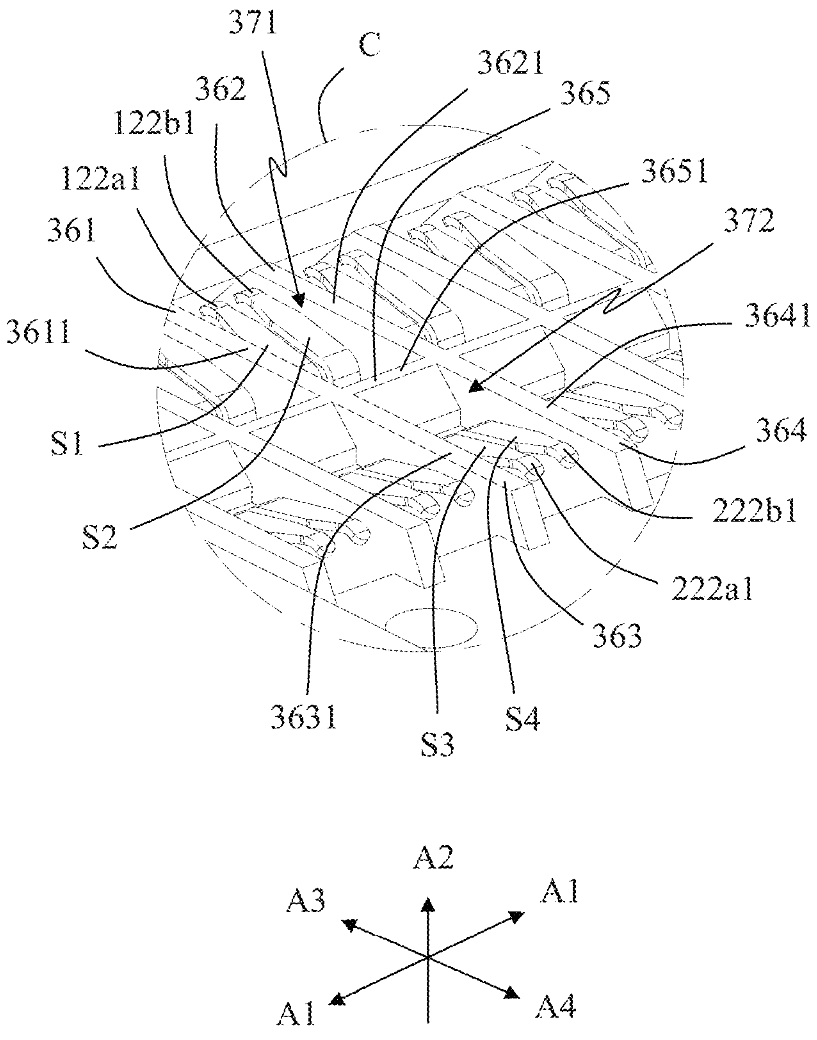
FIG. 8 is a partial enlarged view of a circled part C in FIG. 7.
Figure 9:
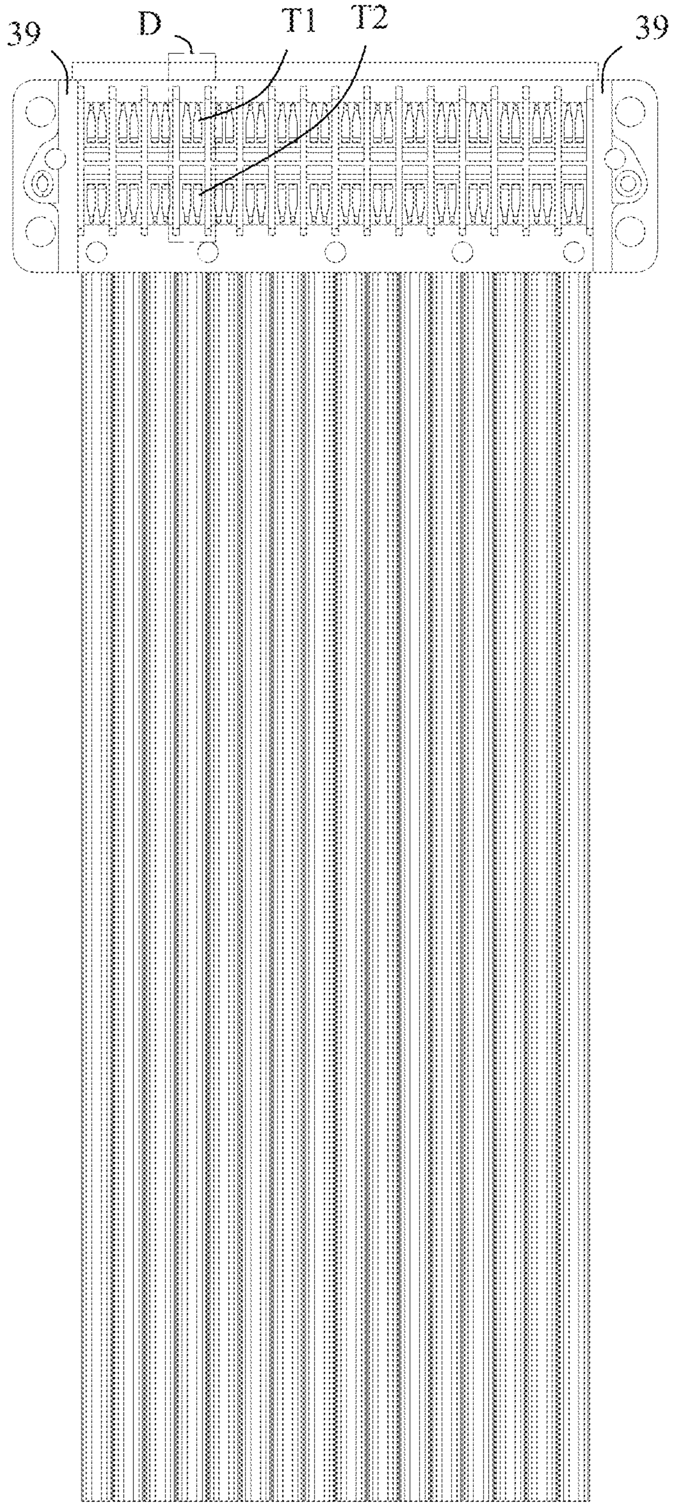
FIG. 9 is a top view of FIG. 7 after removing a conductive film and a mounting plate.
Figure 10:
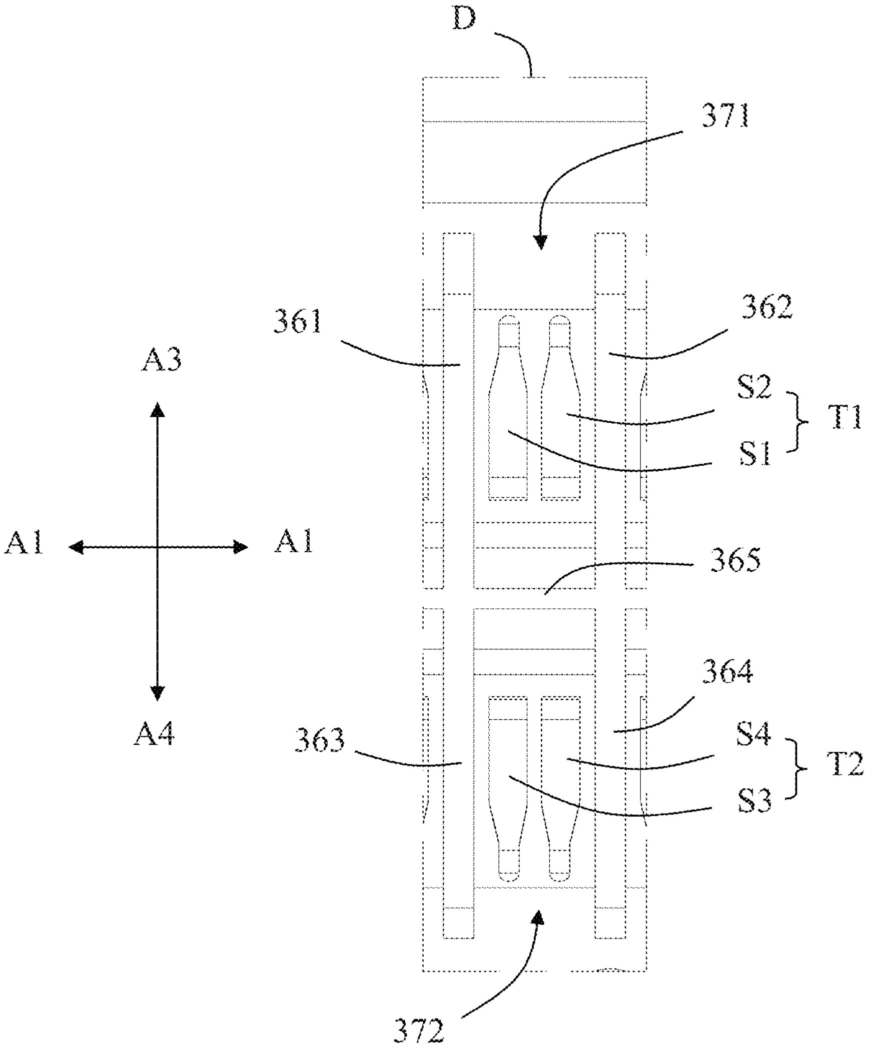
FIG. 10 is a partial enlarged view of a frame part D in FIG. 9.
Figure 11:
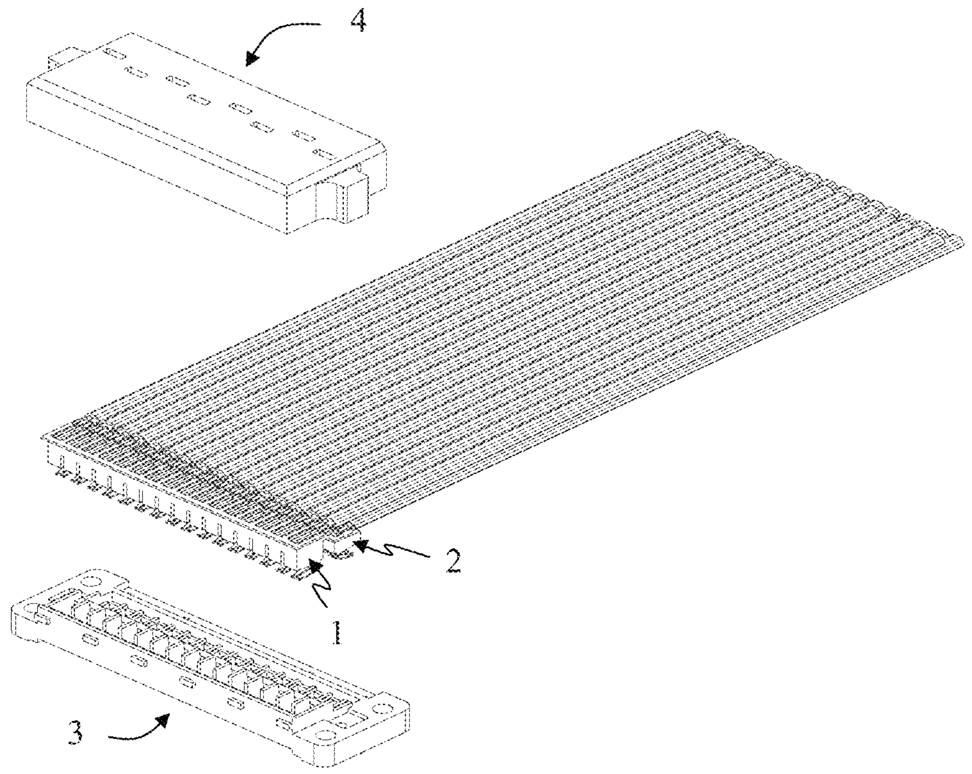
FIG. 11 is a partially exploded perspective view of the electrical connector in FIG. 2.
Figure 12:
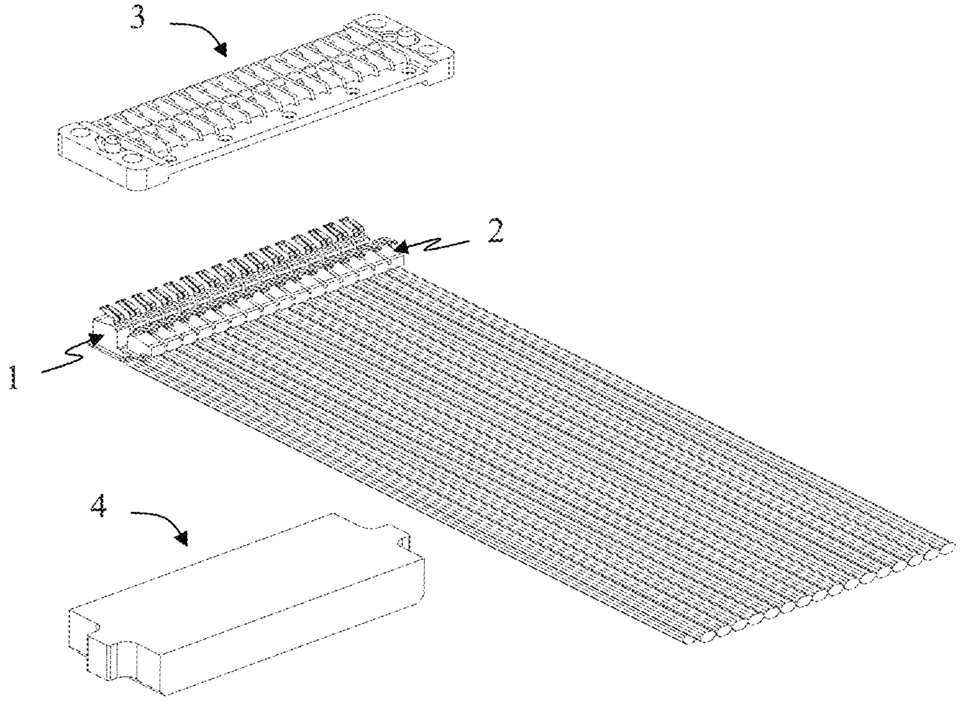
FIG. 12 is a partially exploded perspective view of FIG. 11 from another angle.
Figure 13:
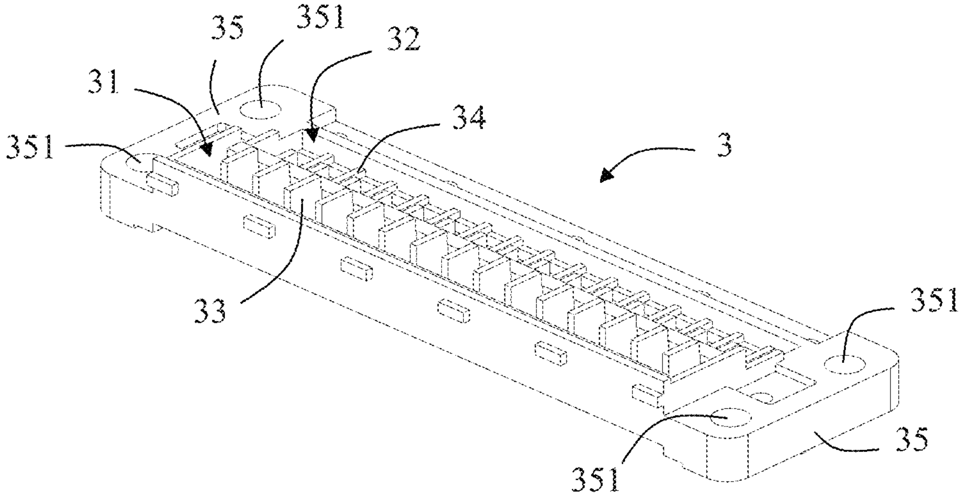
FIG. 13 is a perspective view of a shielding mounting base in FIG. 11.
Figure 14:
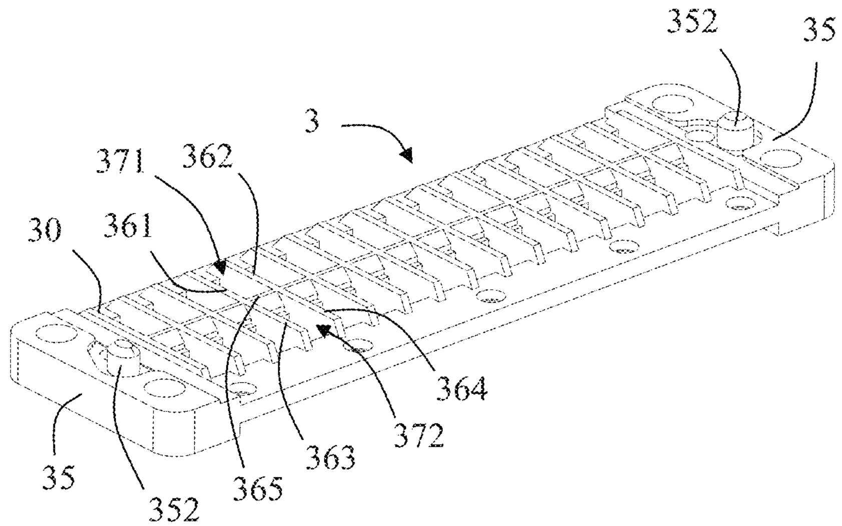
FIG. 14 is a perspective view of the shielding mounting base in FIG. 12.
Figure 15:
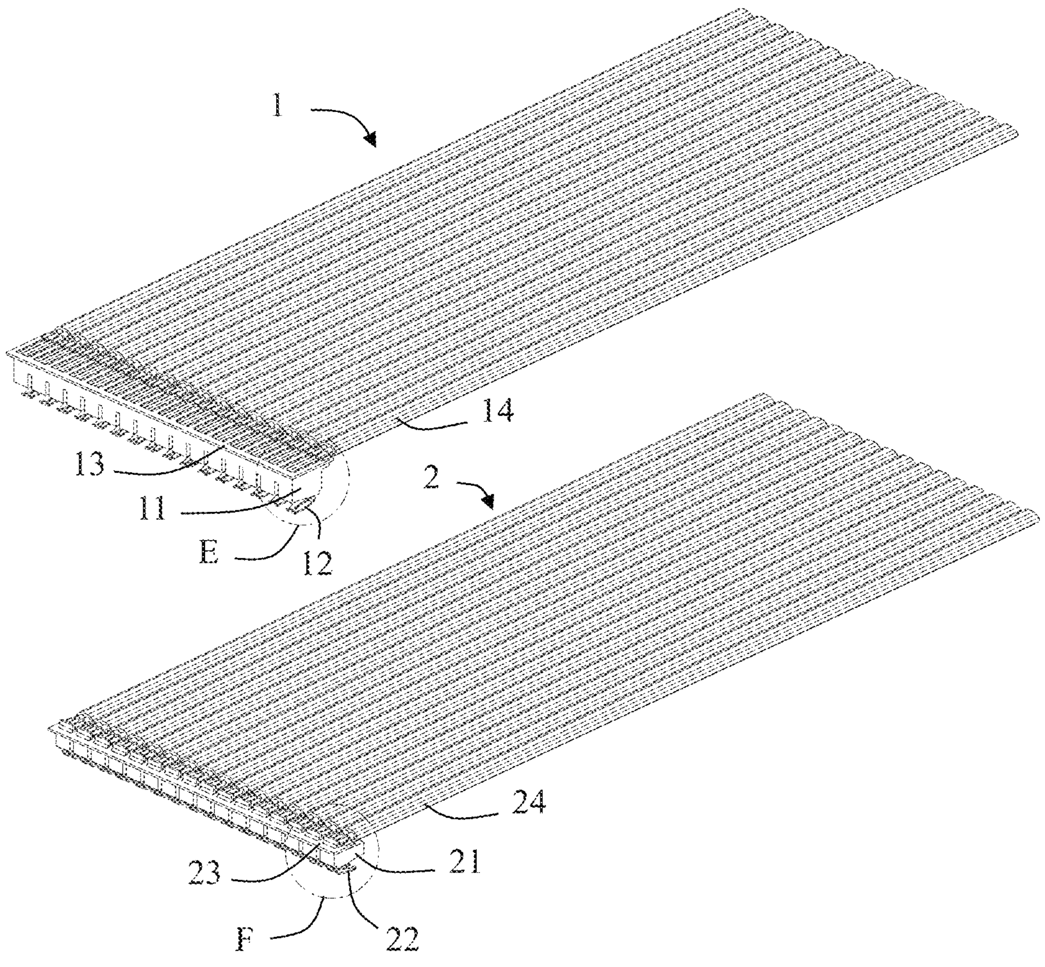
FIG. 15 is a perspective view of a first terminal module and a second terminal module of the electrical connector.
Figure 16:
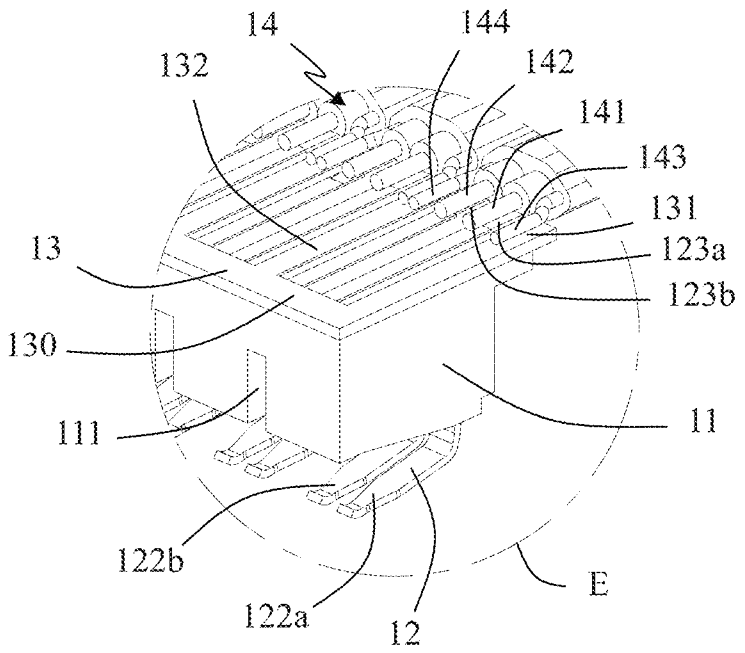
FIG. 16 is a partial enlarged view of a circled part E in FIG. 15.
Figure 17:
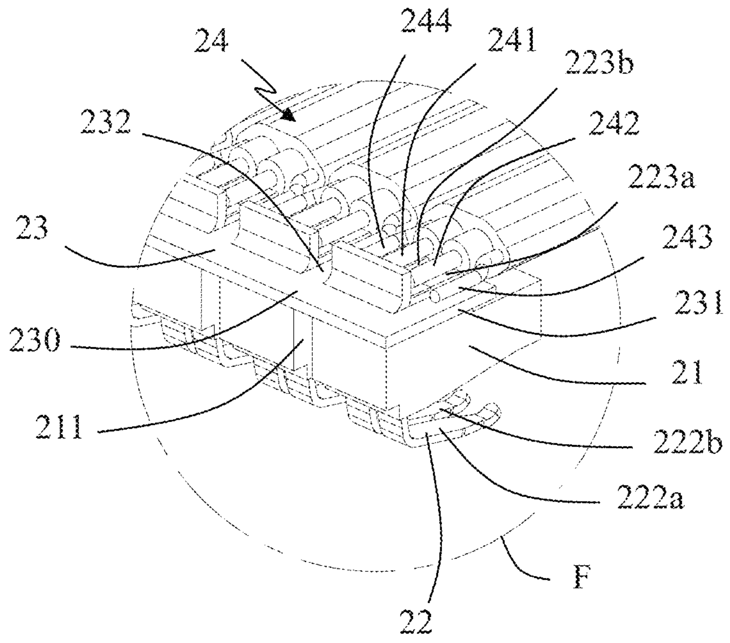
FIG. 17 is a partial enlarged view of a circled part F in FIG. 15.
Figure 18:
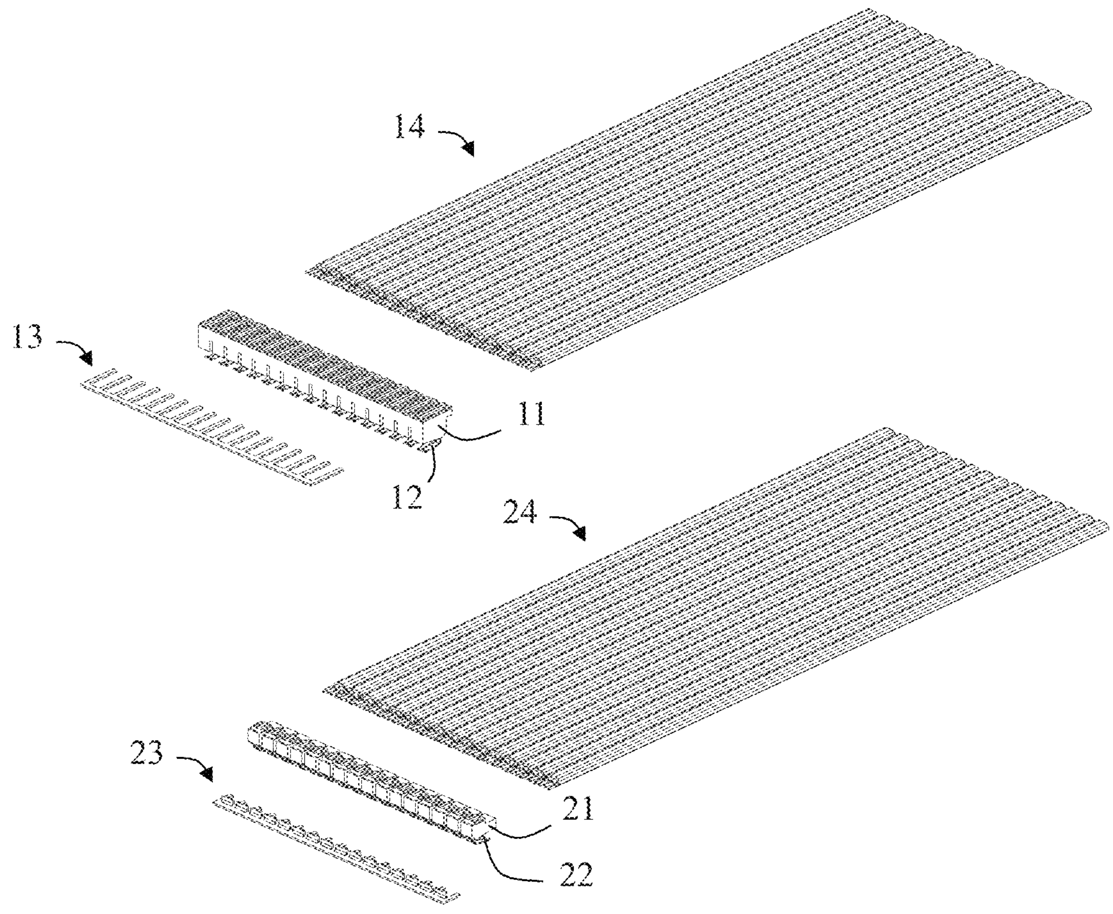
FIG. 18 is a partial perspective view of the first terminal module and the second terminal module in FIG. 15.
Figure 19:
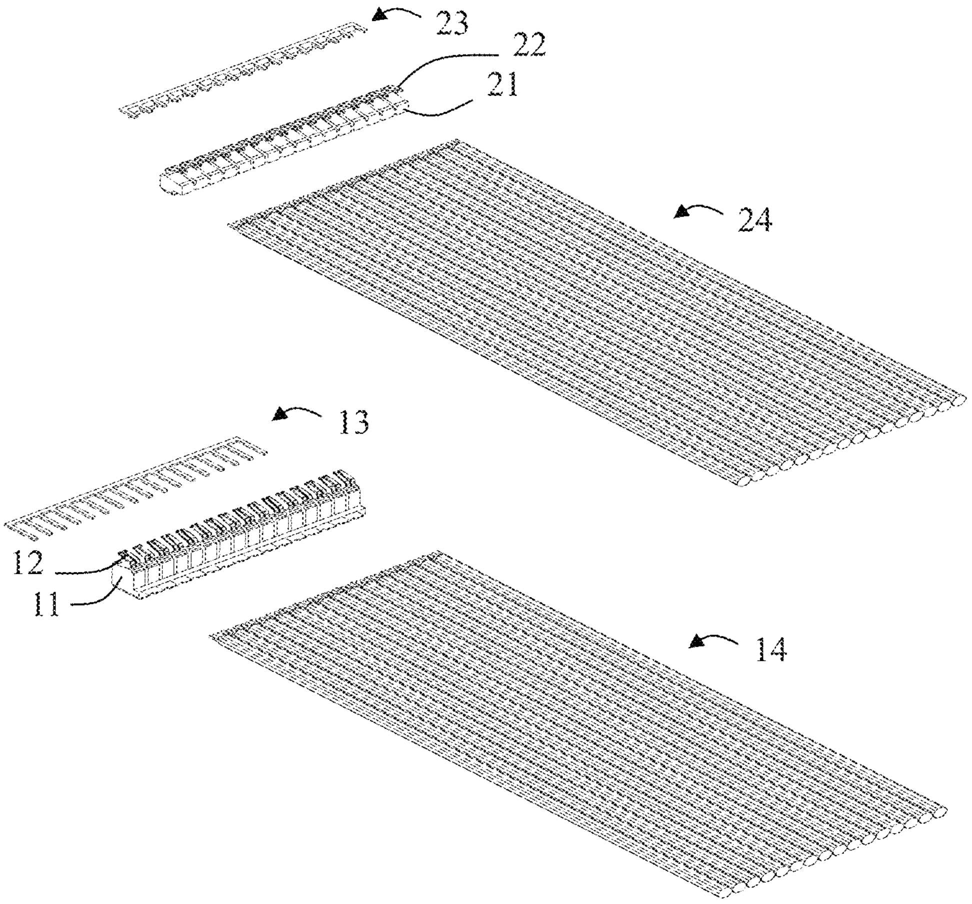
FIG. 19 is a partial perspective view of FIG. 18 from another angle.
Figure 20:
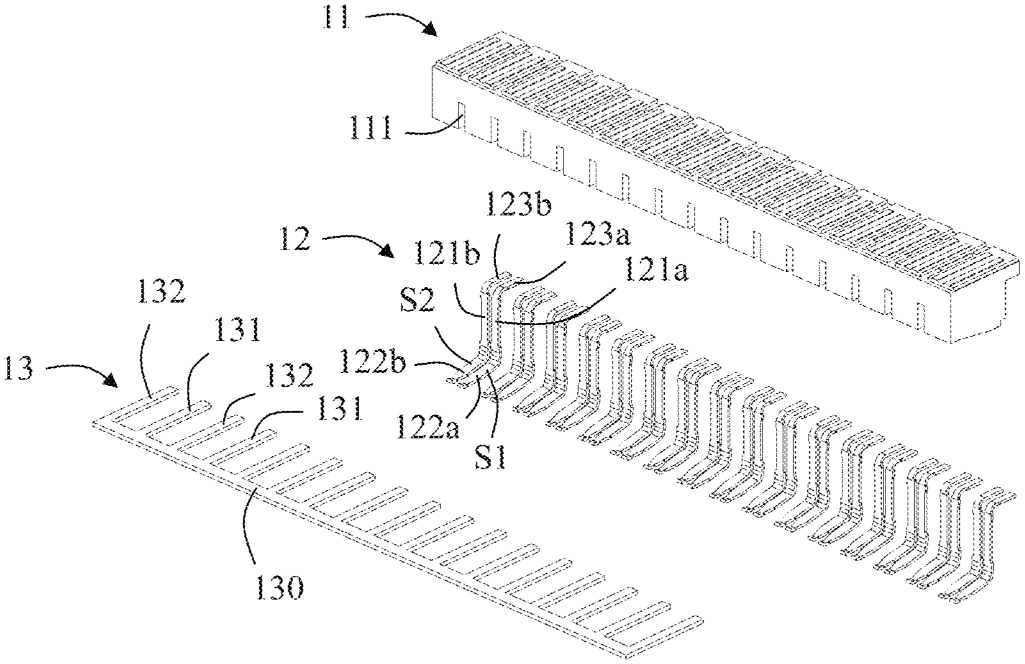
FIG. 20 is an exploded perspective view of a plurality of first conductive terminals, a first insulating block and a first grounding sheet of the first terminal module.
Figure 21:
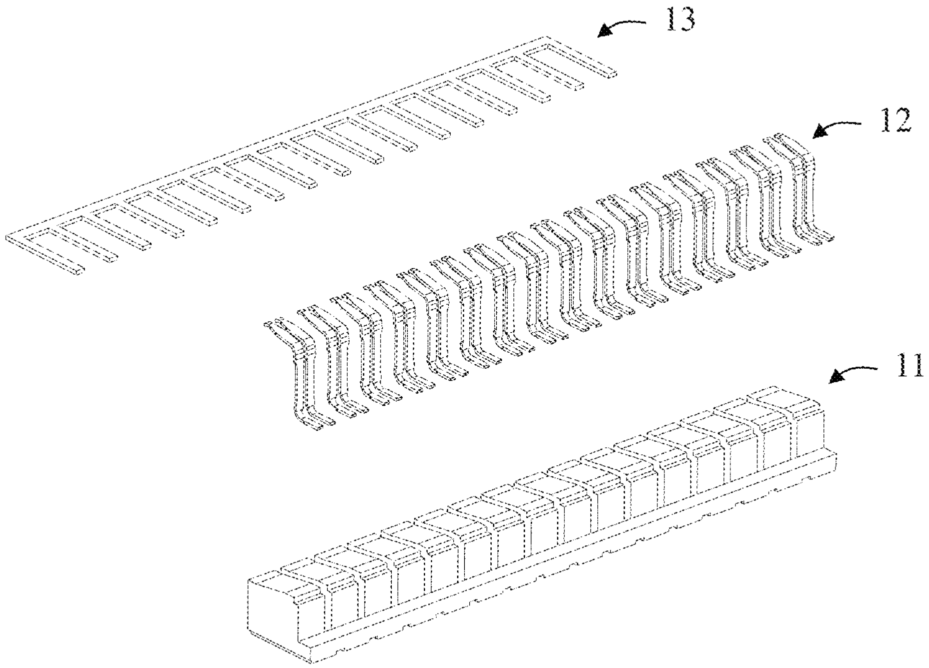
FIG. 21 is an exploded perspective view of FIG. 20 from another angle.
Figure 22:
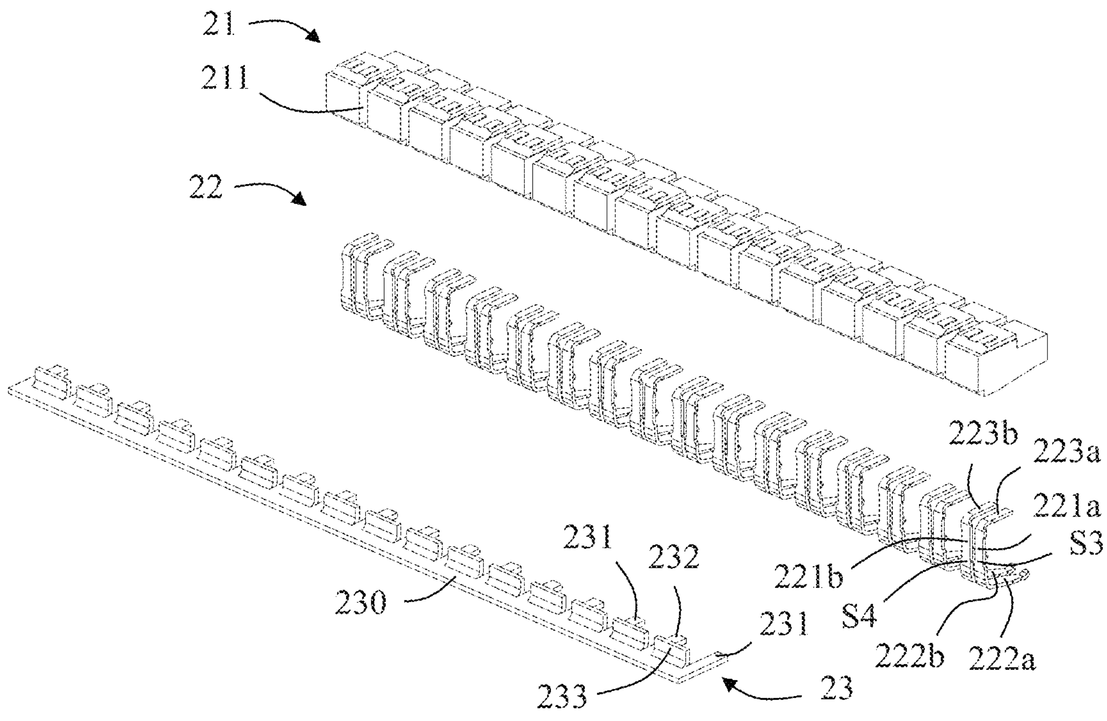
FIG. 22 is an exploded perspective view of a plurality of second conductive terminals, a second insulating block and a second grounding sheet of the second terminal module.
Figure 23:
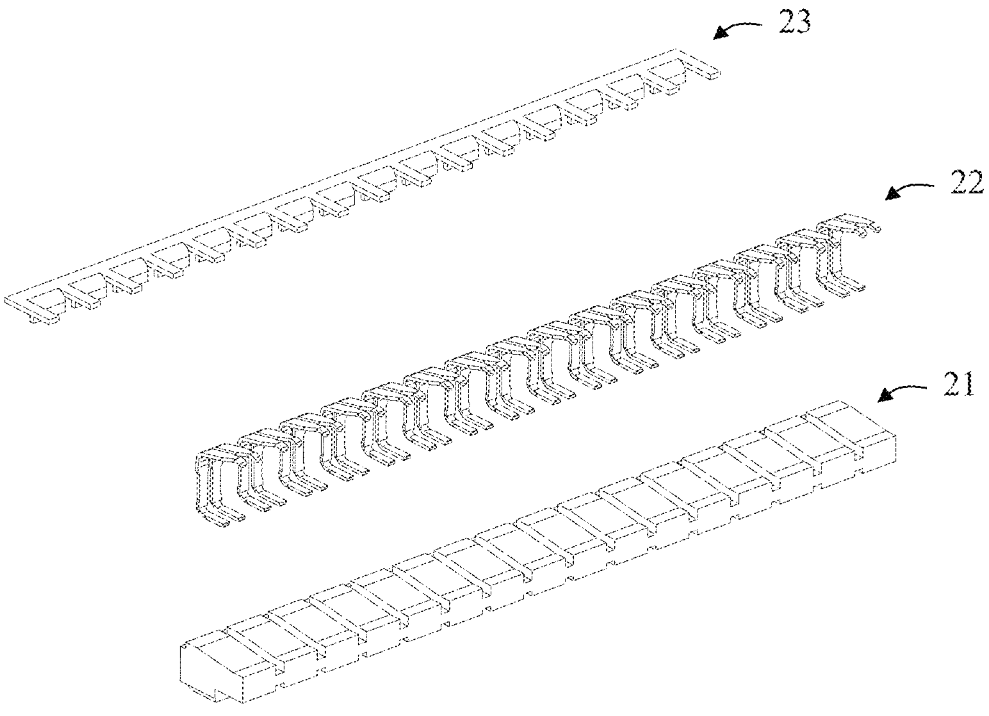
FIG. 23 is an exploded perspective view of FIG. 22 from another angle.
Figure 24:
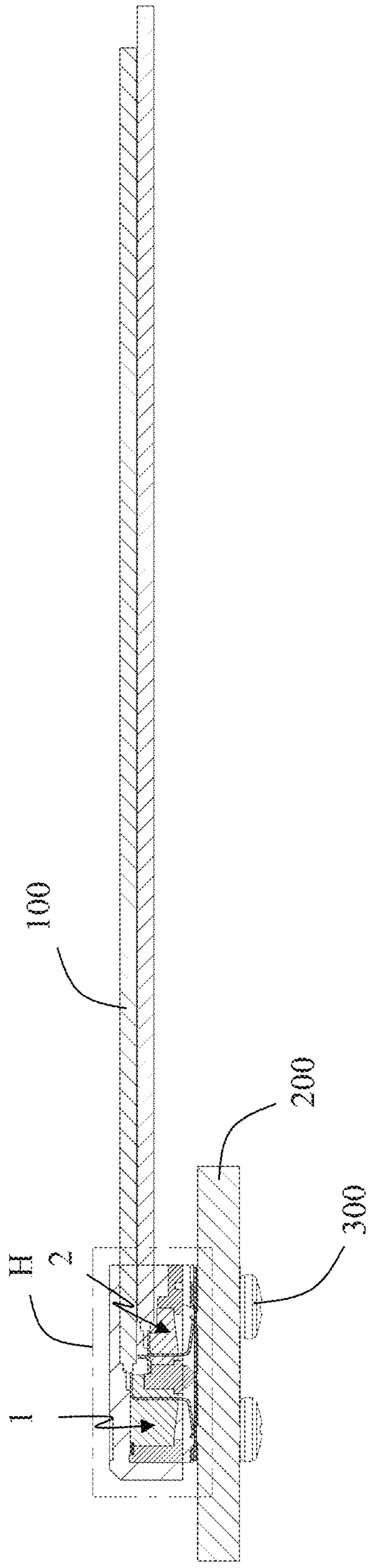
FIG. 24 is a schematic cross-sectional view taken along line G-G in FIG. 1.
Figure 25:
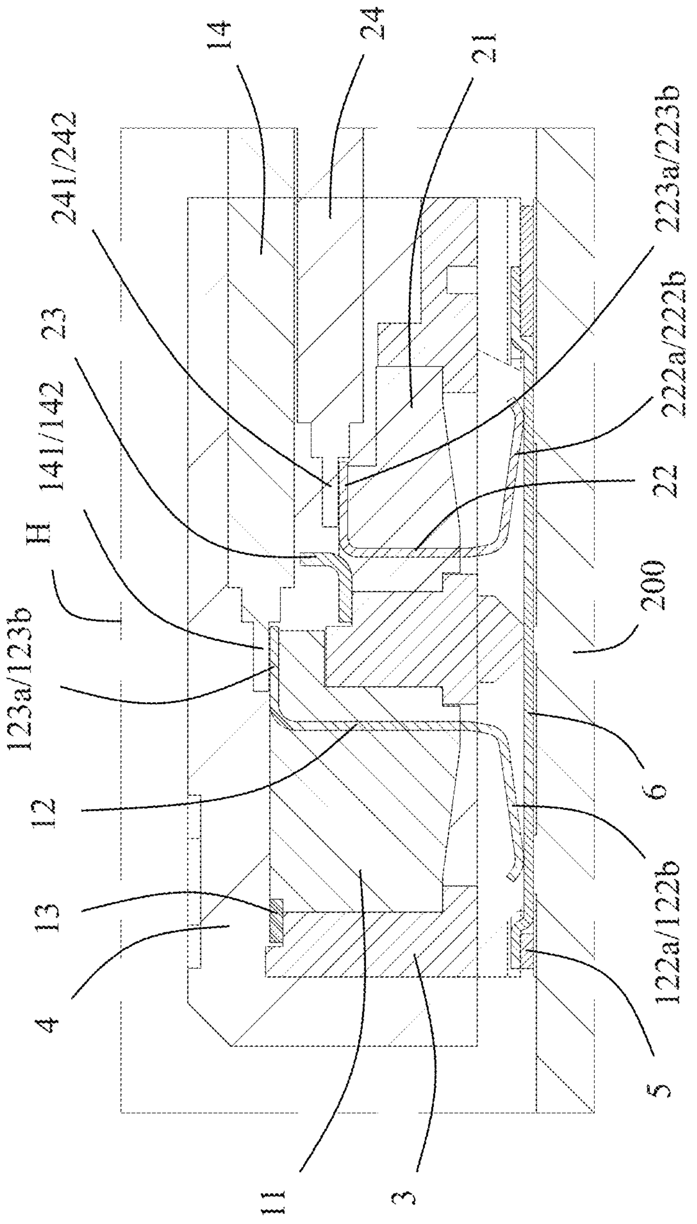
FIG. 25 is a partial enlarged view of a frame part H in FIG. 24.

As shown in FIGS. 7 to 9, a clearance space 39 is provided between the mounting plate 5 and the shielding mounting base 3. The clearance space 39 is used to receive edges of the conductive film 6. During the process of fastening the fasteners 300, the conductive film 6 will change from an initial flat state to a convex state with a middle portion protruding downwardly into the hollow groove 50. A thickness of the mounting plate 5 corresponds to a downward deformation distance of the conductive film 6, which can also play a certain role in controlling the coplanarity of all components which are abutting against the conductive film 6.

In the illustrated embodiment of the present disclosure, the conductive film 6 covers the first elastic contact arms **122*a*, the second elastic contact arms 122*b*, the first ribs 361 and the second ribs 362. The conductive film 6 also covers the third elastic contact arms 222*a*, the fourth elastic contact arms 222*b*, the third ribs 363 and the fourth ribs 364**.

The first elastic contact arm **122*a* of the first signal terminal S1 and the second elastic contact arm 122*b* of the second signal terminal S2 are configured to be respectively electrically connected to the first signal conductive pad 201*a* and the second signal conductive pad 201*b* of the circuit board 200, indirectly, through elastic contact. The first rib 361 and the second rib 362 are configured to be respectively electrically connected to the first ground conductive pad 2031 and the second ground conductive pad 2032 of the circuit board 200**, indirectly, through rigid contact.

Similarly, the third elastic contact arm **222*a* of the third signal terminal S3 and the fourth elastic contact arm 222*b* of the fourth signal terminal S4 are configured to be respectively electrically connected to the third signal conductive pad 202*a* and the fourth signal conductive pad 202*b* of the circuit board 200, indirectly, through elastic contact. The third rib 363 and the fourth rib 364 are configured to be respectively electrically connected to the third ground conductive pad 2033 and the fourth ground conductive pad 2034 of the circuit board 200**, indirectly, through rigid contact.

In the illustrated embodiment of the present disclosure, the first contact portion **122*a*1 of the first elastic contact arm 122*a*, the second contact portion 122*b*1 of the second elastic contact arm 122*b*, the third contact portion 222*a*1 of the third elastic contact arm 222*a* and the fourth contact portion 222*b*1 of the fourth elastic contact arm 222*b* protrude beyond the first plane along the second direction A2**, or flush with the first plane.

The conductive film 6 includes a plurality of conductive particles along a pressing direction thereof. When the conductive film 6 is not pressed, the conductive particles are spaced a certain distance apart from each other, so that the conductive film 6 does not have conductive properties. When the conductive film 6 is pressed, adjacent conductive particles approach and contact each other, so that the conductive film 6 has conductive properties. The working principle of the conductive film 6 is well known to those skilled in the art, and will not be described in detail in the present disclosure. It is understandable to those skilled in the art that a thickness of the conductive film 6 is relatively thin, when the conductive particles are pressed to conduct electricity, the requirements for pressing force are relatively high.

It is understandable to those skilled in the art that if the first elastic contact arm **122*a*, the second elastic contact arm 122*b*, the third elastic contact arm 222*a* and the fourth elastic contact arm 222*b* in the illustrated embodiment of the present disclosure are replaced with non-elastic structures, to successfully achieve a stable electrical connection with the conductive pads of the circuit board 200 through the conductive film 6, very stringent requirements will be put forward for the coplanarity of these non-elastic structures themselves, and the coplanarity of the first rib 361, the second rib 362, the third rib 363 and the fourth rib 364**. Such stringent requirements will greatly increase the difficulty of manufacturing and are not beneficial to improve product yields.

In the illustrated embodiment of the present disclosure, on the one hand, the first rib 361, the second rib 362, the third rib 363 and the fourth rib 364 exert pressing force to the conductive film 6, which is beneficial to ensure the stability of the pressing force. On the other hand, since the first elastic contact arm **122*a*, the second elastic contact arm 122*b*, the third elastic contact arm 222*a* and the fourth elastic contact arm 222*b* have a certain elastic deformation ability, they can compensate for the problem of unqualified contact force due to the difference in coplanarity when the first contact portion 122*a*1 of the first elastic contact arm 122*a*, the second contact portion 122*b*1 of the second elastic contact arm 122*b*, the third contact portion 222*a*1 of the third elastic contact arm 222*a* and the fourth contact portion 222*b*1 of the fourth elastic contact arm 222*b* contact the conductive film 6**. The hybrid structure of the ribs and elastic contact arms adopted by the present disclosure cleverly solves the manufacturing problem and has outstanding technical effects.

Besides, compared with direct contact, by providing the conductive film 6, it is beneficial to protect conductive components of the circuit board 200, thereby reducing the risk of the conductive element being scratched, and improving the reliability of the product.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising: a first terminal module comprising a first insulating block and a plurality of first conductive terminals fixed to the first insulating block; the plurality of first conductive terminals comprising at least one first terminal group; each first terminal group comprising a first signal terminal and a second signal terminal;

the first signal terminal and the second signal terminal being disposed adjacent to each other and disposed side by side along a first direction; the first signal terminal comprising a first elastic contact arm; the second signal terminal comprising a second elastic contact arm; and a shielding mounting base, the first terminal module being at least partially mounted to the shielding mounting base; the shielding mounting base comprising a mounting surface, a first rib exposed to the mounting surface, a second rib exposed to the mounting surface, and a first accommodation space located between the first rib and the second rib; the first elastic contact arm of the first signal terminal and the second elastic contact arm of the second signal terminal of the first terminal group at least partially extending into the first accommodation space along a second direction; and a conductive film; wherein the conductive film covers the first elastic contact arm, the second elastic contact arm, the first rib and the second rib; wherein the first rib, the first elastic contact arm of the first signal terminal, the second elastic contact arm of the second signal terminal, and the second rib are sequentially disposed along the first direction;

the first elastic contact arm of the first signal terminal and the second elastic contact arm of the second signal terminal are configured to be respectively electrically connected to a first signal conductive pad and a second signal conductive pad of a circuit board, directly or indirectly, through elastic contact; the first rib and the second rib serve as a first ground terminal and a second ground terminal respectively, and are configured to be respectively electrically connected to a first ground conductive pad and a second ground conductive pad of the circuit board, directly or indirectly, through rigid contact.

2. The electrical connector according to claim 1, wherein the first elastic contact arm of the first signal terminal and the second elastic contact arm of the second signal terminal are configured to be respectively electrically connected to the first signal conductive pad and the second signal conductive pad of the circuit board indirectly, through elastic contact; the first rib and the second rib are configured to be respectively electrically connected to the first ground conductive pad and the second ground conductive pad of the circuit board, indirectly, through rigid contact.

3. The electrical connector according to claim 2, further comprising a mounting plate mounted to the shielding mounting base; wherein the conductive film is clamped between the shielding mounting base and the mounting plate.

4. The electrical connector according to claim 3, wherein the mounting plate defines a hollow groove, and the conductive film is at least partially exposed in the hollow groove.

5. The electrical connector according to claim 1, wherein the first elastic contact arm comprises a first contact portion that is electrically connected to the first signal conductive pad, directly or indirectly; the second elastic contact arm comprises a second contact portion that is electrically connected to the second signal conductive pad, directly or indirectly; the first rib comprises a first contact surface that is electrically connected to the first ground conductive pad, directly or indirectly; the second rib comprises a second contact surface that is electrically connected to the second ground conductive pad, directly or indirectly; the first contact surface and the second contact surface are coplanar and both are located in a first plane; and wherein the first contact portion and the second contact portion protrude beyond the first plane along the second direction which is perpendicular to the first direction; or the first contact portion and the second contact portion are flush with the first plane.

6. The electrical connector according to claim 1, wherein the shielding mounting base comprises a first installation groove and at least one first positioning block protruding into the first installation groove; the first insulating block is at least partially received in the first installation groove; the first insulating block defines at least one first positioning slot to receive the at least one first positioning block.

7. The electrical connector according to claim 1, further comprising a second terminal module; wherein the second terminal module comprises a second insulating block and a plurality of second conductive terminals fixed to the second insulating block; the plurality of second conductive terminals comprises at least one second terminal group; each second terminal group comprises a third signal terminal and a fourth signal terminal; the third signal terminal and the fourth signal terminal are located adjacent to each other and arranged side by side along the first direction; the third signal terminal comprises a third elastic contact arm; the fourth signal terminal comprises a fourth elastic contact arm;

the second terminal module is at least partially mounted to the shielding mounting base; the shielding mounting base comprises a third rib exposed to the mounting surface, a fourth rib exposed to the mounting surface, and a second accommodation space located between the third rib and the fourth rib; the third elastic contact arm of the third signal terminal and the fourth elastic contact arm of the fourth signal terminal of the second terminal group extend at least partially into the second accommodation space along the second direction;

wherein the third rib, the third elastic contact arm of the third signal terminal, the fourth elastic contact arm of the fourth signal terminal, and the fourth rib are disposed sequentially along the first direction; the third elastic contact arm of the third signal terminal and the fourth elastic contact arm of the fourth signal terminal are configured to be respectively electrically connected to a third signal conductive pad and a fourth signal conductive pad of the circuit board, directly or indirectly; the third rib and the fourth rib serve as a third ground terminal and a fourth ground terminal, respectively, and are configured to be respectively electrically connected to a third ground conductive pad and a fourth ground conductive pad of the circuit board, directly or indirectly.

8. The electrical connector according to claim 7, wherein the first rib, the first elastic contact arm of the first signal terminal, the second elastic contact arm of the second signal terminal and the second rib are sequentially disposed in a first row along the first direction;

the third rib, the third elastic contact arm of the third signal terminal, the fourth elastic contact arm of the fourth signal terminal and the fourth rib are sequentially arranged in a second row along the first direction; and the first row and the second row are parallel to each other.

9. The electrical connector according to claim 7, wherein the first elastic contact arm of the first signal terminal and the second elastic contact arm of the second signal terminal extend along a third direction; the third direction is perpendicular to the first direction and the second direction;

the third elastic contact arm of the third signal terminal and the fourth elastic contact arm of the fourth signal terminal extend along a fourth direction; and the third direction is opposite to the fourth direction.

10. The electrical connector according to claim 9, wherein the first elastic contact arm of the first signal terminal and the third elastic contact arm of the third signal terminal are aligned and disposed along the third direction;

the second elastic contact arm of the second signal terminal and the fourth elastic contact arm of the fourth signal terminal are aligned and disposed along the third direction.

11. The electrical connector according to claim 7, wherein the third elastic contact arm of the third signal terminal and the fourth elastic contact arm of the fourth signal terminal are configured to be respectively electrically connected to the third signal conductive pad and the fourth signal conductive pad of the circuit board, directly or indirectly, through elastic contact;

the third rib and the fourth rib are configured to be respectively electrically connected to the third ground conductive pad and the fourth ground conductive pad of the circuit board, directly or indirectly, through rigid contact.

12. The electrical connector according to claim 7, wherein the shielding mounting base further comprises a connecting bar exposed to the mounting surface; the connecting bar extends along the first direction;

the connecting bar connects the first rib and the second rib; the connecting bar connects the third rib and the fourth rib;

the first rib and the second rib are located on one side of the connecting bar; the third rib and the fourth rib are located on another side of the connecting bar.

13. The electrical connector according to claim 7, wherein the first terminal module comprises a plurality of first cables and a first grounding sheet mounted to the first insulating block; the plurality of first cables comprise a first signal cable, a second signal cable, a first ground cable and a second ground cable; the first grounding sheet comprises a first mounting tab and a second mounting tab;

the first signal terminal comprises a first soldering portion; the second signal terminal comprises a second soldering portion; the first mounting tab, the first soldering portion, the second soldering portion and the second mounting tab are disposed sequentially along the first direction;

the first ground cable is connected to the first mounting tab; the first signal cable is connected to the first soldering portion; the second signal cable is connected to the second soldering portion; the second ground cable is connected to the second mounting tab;

the first grounding sheet is in contact with the shielding mounting base.

14. The electrical connector according to claim 13, wherein the second terminal module comprises a plurality of second cables and a second grounding sheet mounted to the second insulating block; the plurality of second cables comprise a third signal cable, a fourth signal cable, a third ground cable and a fourth ground cable; the second grounding sheet comprises a third mounting tab and a fourth mounting tab;

the third signal terminal comprises a third soldering portion; the fourth signal terminal comprises a fourth soldering portion; the third mounting tab, the third soldering portion, the fourth soldering portion and the fourth mounting tab are disposed sequentially along the first direction;

the third ground cable is connected to the third mounting tab; the third signal cable is connected to the third soldering portion; the fourth signal cable is connected to the fourth soldering portion; the fourth ground cable is connected to the fourth mounting tab;

the second grounding sheet is in contact with the shielding mounting base and/or the first grounding sheet.

15. The electrical connector according to claim 1, wherein the shielding mounting base is made of metal and/or conductive plastic.

16. A connector assembly, comprising: a circuit board comprising a first signal conductive pad, a second signal conductive pad, a first ground conductive pad and a second ground conductive pad; and an electrical connector mounted to the circuit board, the electrical connector comprising: a first terminal module comprising a first insulating block and a plurality of first conductive terminals fixed to the first insulating block; the plurality of first conductive terminals comprising at least one first terminal group; each first terminal group comprising a first signal terminal and a second signal terminal; the first signal terminal and the second signal terminal being disposed adjacent to each other and disposed side by side along a first direction; the first signal terminal comprising a first elastic contact arm; the second signal terminal comprising a second elastic contact arm; a shielding mounting base, the first terminal module being at least partially mounted to the shielding mounting base; the shielding mounting base comprising a first rib, a second rib, and a first accommodation space located between the first rib and the second rib; the first elastic contact arm of the first signal terminal and the second elastic contact arm of the second signal terminal of the first terminal group at least partially extending into the first accommodation space along a second direction; and a conductive film; wherein the conductive film covers the first elastic contact arm, the second elastic contact arm, the first rib and the second rib; wherein the first rib, the first elastic contact arm of the first signal terminal, the second elastic contact arm of the second signal terminal, and the second rib are sequentially disposed along the first direction; the first elastic contact arm of the first signal terminal and the second elastic contact arm of the second signal terminal are configured to be respectively electrically connected to the first signal conductive pad and the second signal conductive pad, directly or indirectly; the first rib and the second rib serve as a first ground terminal and a second ground terminal respectively, and are configured to be respectively electrically connected to the first ground conductive pad and the second ground conductive pad, directly or indirectly.

17. The connector assembly according to claim 16, wherein the circuit board comprises a ground connection portion which connects the first ground conductive pad and the second ground conductive pad in series into a whole.

18. The connector assembly according to claim 16, further comprising a fastener which fastens the shielding mounting base and the circuit board.

19. The connector assembly according to claim 16, wherein the first elastic contact arm of the first signal terminal and the second elastic contact arm of the second signal terminal are configured to be respectively electrically connected to the first signal conductive pad and the second signal conductive pad of the circuit board, directly or indirectly, through elastic contact;

the first rib and the second rib are configured to be respectively electrically connected to the first ground conductive pad and the second ground conductive pad of the circuit board, directly or indirectly, through rigid contact.

* * * * *